(12) United States Patent
Peng et al.

(10) Patent No.: US 7,817,686 B2
(45) Date of Patent: Oct. 19, 2010

(54) LASER MICROMACHINING USING PROGRAMMABLE PULSE SHAPES

(75) Inventors: Xiaoyuan Peng, Portland, OR (US); Brian W. Baird, Portland, OR (US); William J. Jordens, Beaverton, OR (US); David Martin Hemenway, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 12/057,264

(22) Filed: Mar. 27, 2008

(65) Prior Publication Data
US 2009/0245301 A1 Oct. 1, 2009

(51) Int. Cl.
*H01S 3/098* (2006.01)
(52) U.S. Cl. .......................................... 372/25; 372/26
(58) Field of Classification Search ............... 372/26, 372/50.11, 10, 25; 359/572; 219/121.6
See application file for complete search history.

(56) References Cited

U.S. PATENT DOCUMENTS

| | | | |
|---|---|---|---|
| 3,747,019 A | 7/1973 | Koechner et al. | |
| 4,937,457 A * | 6/1990 | Mitchell | 250/458.1 |
| 5,719,372 A | 2/1998 | Togari et al. | |
| 5,998,759 A * | 12/1999 | Smart | 219/121.69 |
| 6,878,899 B2 * | 4/2005 | Smart | 219/121.61 |
| 6,947,454 B2 | 9/2005 | Sun et al. | |
| 6,961,355 B1 * | 11/2005 | Yin et al. | 372/25 |
| 7,126,746 B2 * | 10/2006 | Sun et al. | 359/333 |
| 7,502,111 B2 * | 3/2009 | Gibbs | 356/364 |
| 2002/0167581 A1 * | 11/2002 | Cordingley et al. | 347/173 |
| 2005/0067388 A1 | 3/2005 | Sun et al. | |
| 2005/0100062 A1 * | 5/2005 | Grant et al. | 372/10 |
| 2005/0281306 A1 | 12/2005 | Nakao et al. | |
| 2006/0028655 A1 | 2/2006 | Cordingley et al. | |
| 2006/0126674 A1 | 6/2006 | Sun et al. | |
| 2006/0126677 A1 | 6/2006 | Sun et al. | |
| 2007/0153841 A1 | 7/2007 | Sun | |

OTHER PUBLICATIONS

International Search Report, International Patent Application No. PCT/US2009/038489, dated Oct. 30, 2009, 3 pages, and Written Opinion, dated Oct. 30, 2009, 4 pages.
Dimitriev, V.G., Gurzadyan, and Nikogosyan, D.N., "Handbook of Nonlinear Optical Crystals," 1991, pp. 1-51 and 138-141, Springer-Verlag Berlin Heidelberg, Fed. Rep. of Germany.

* cited by examiner

*Primary Examiner*—Minsun Harvey
*Assistant Examiner*—Tuan N. Nguyen
(74) *Attorney, Agent, or Firm*—Stoel Rives LLP

(57) ABSTRACT

Laser pulse shaping techniques produce tailored laser pulse spectral output. The laser pulses can be programmed to have desired pulse widths and pulse shapes (such as sub-nanosecond to 10 ns-20 ns pulse widths with 1 ns to several nanoseconds leading edge rise times). Preferred embodiments are implemented with one or more electro-optical modulators receiving drive signals that selectively change the amount of incident pulsed laser emission to form a tailored pulse output. Triggering the drive signal from the pulsed laser emission suppresses jitter associated with other stages of the link processing system and substantially removes jitter associated with pulsed laser emission build-up time.

19 Claims, 14 Drawing Sheets

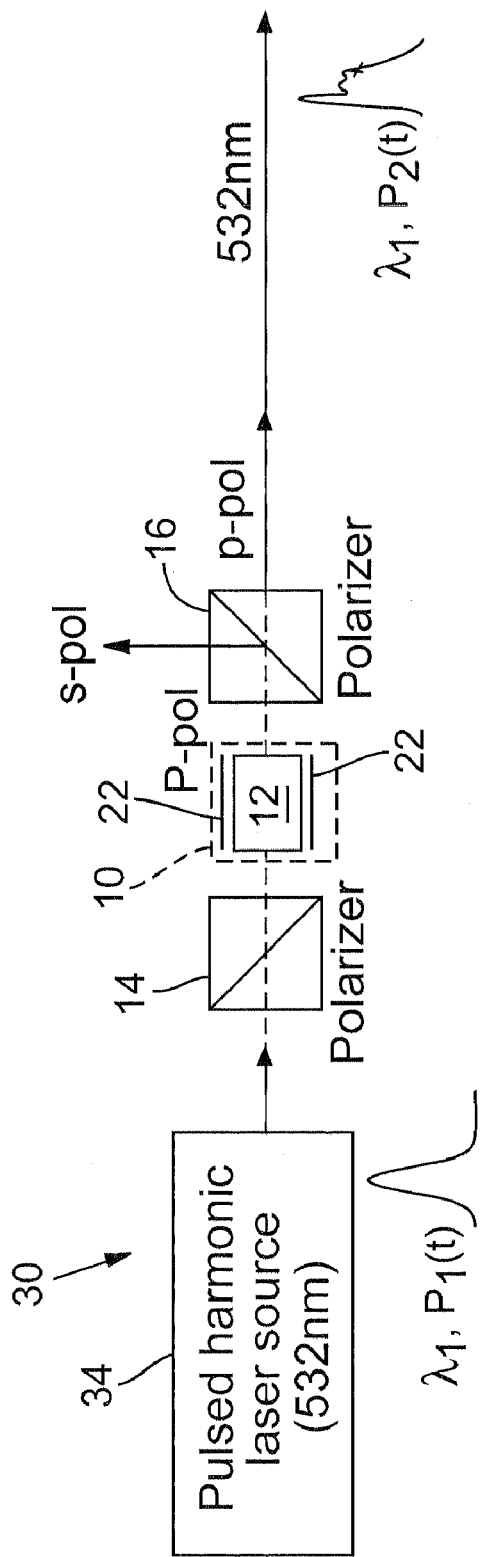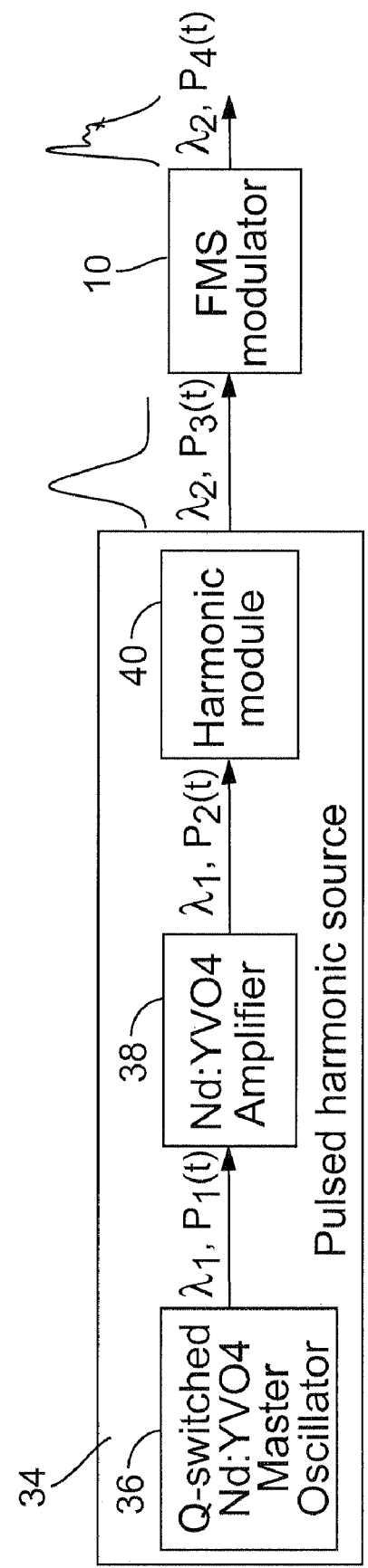
FIG. 3A
FIG. 3B

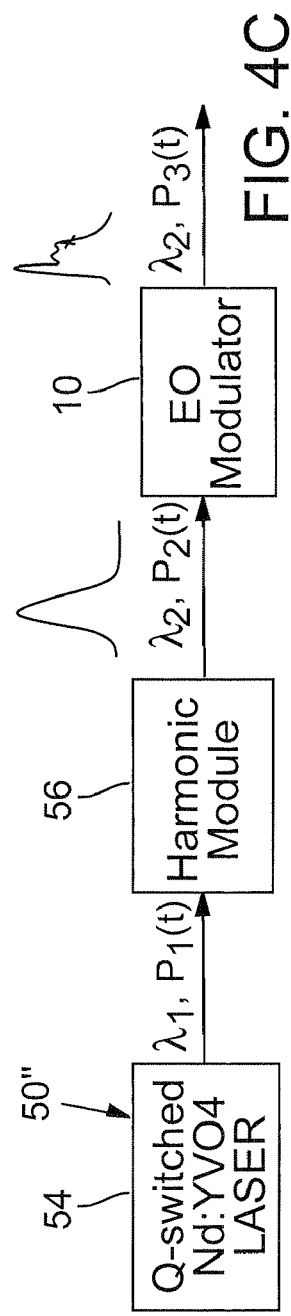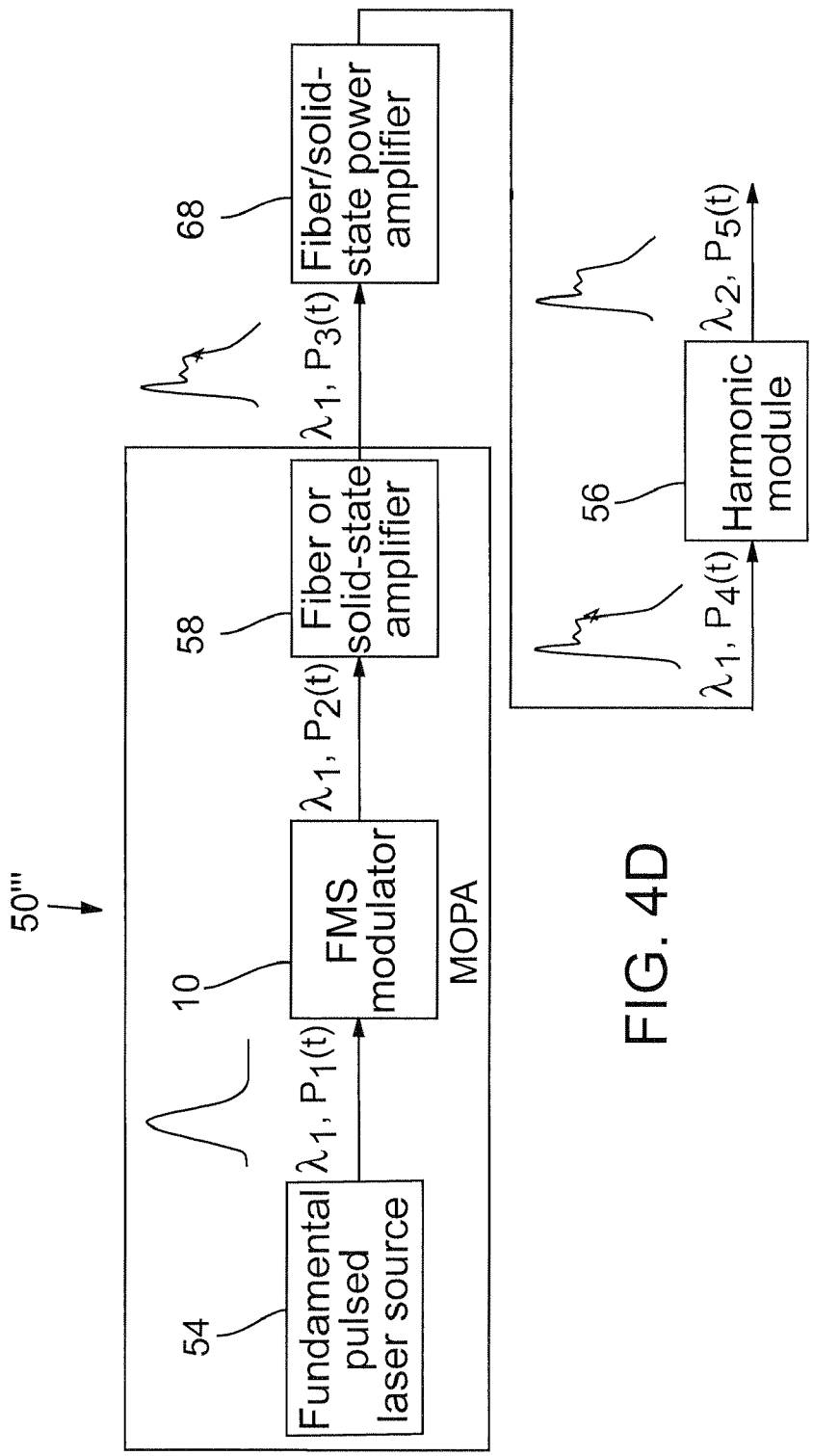
FIG. 4C
FIG. 4D

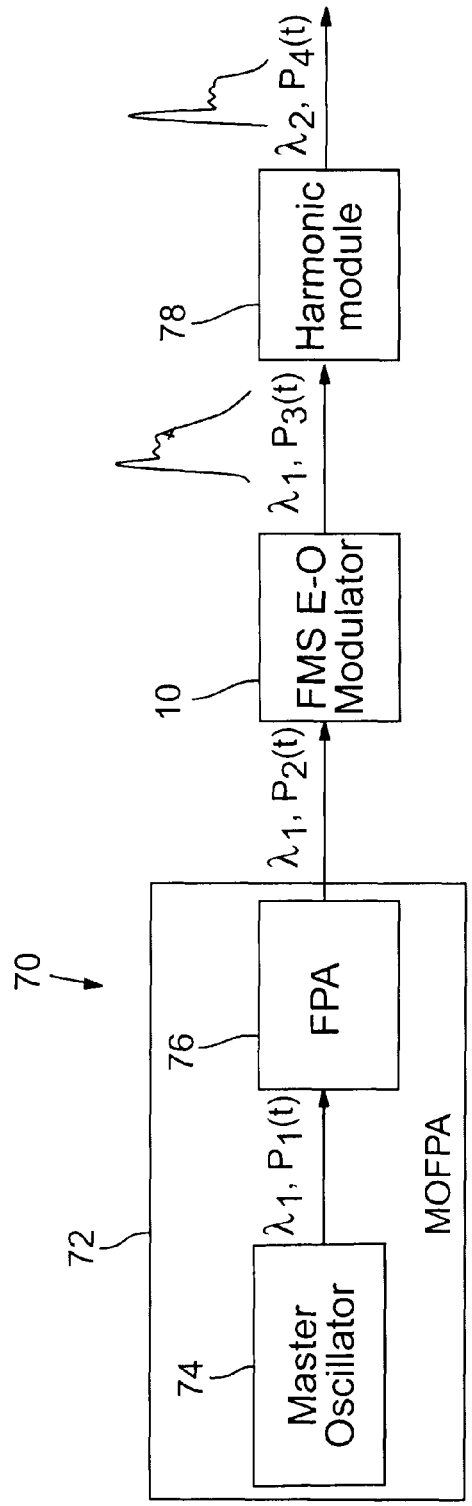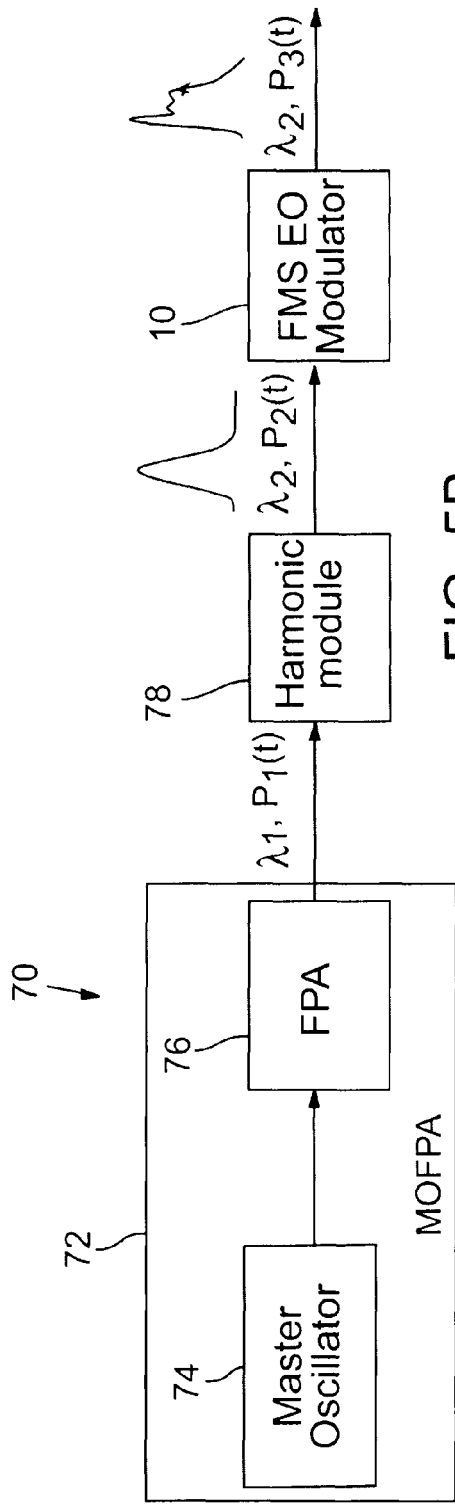
FIG. 5A
FIG. 5B

LASER MICROMACHINING USING PROGRAMMABLE PULSE SHAPES

BACKGROUND INFORMATION

Many laser micromachining processes require laser pulses of various shapes. For example, laser processing of multiple layers of different materials demands fairly large adjustable ranges of laser power, pulse repetition rate, pulse width, spot size, and pulse shape to achieve either or both of desired quality and throughput. With a conventional Q-switched laser, all of the parameters can be adjusted over only limited ranges, especially the pulse width and pulse shape. Conventional lasers generally limit the option of having adjustable pulse width and pulse shape. As another example, the processing of electrically conductive links on memory chips or other integrated circuit (IC) chips demands pulses with a fairly short leading edge rise time (e.g., 1 ns-2 ns rise time) to achieve desired quality and yield. With existing solid-state lasers, the leading edge rise time changes with pulse width. A traditional longer leading edge rise time of a 5 ns-10 ns wide laser pulse could result in excess removal of ("over-crater in") the overlying passivation layer material during link processing, especially when the overlying passivation layer is too thick or varies over a wide range across a wafer or among a group of wafers.

For via drilling of certain printed circuit boards (PCBs), pulse width critically affects throughput and via size. Certain of these drilling applications require laser pulses of sub-nanosecond, or even picosecond, pulse widths. Some laser link processes using traditional laser pulses with pulse widths of a few nanoseconds to a few tens of nanoseconds tend to over-crater in thicker overlying passivation layers and thereby cause IC reliability problems. Use of a laser pulse with a special shape and a fast leading edge, such as tailored pulse, is one technique for controlling link processing. The shaped laser pulse can be generated by diode-seeding a fiber laser and amplifier (MOPA). However, the MOPA structure constructed with a fiber laser as the power amplifier is quite complicated and costly. Moreover, the fiber amplifier suffers from a relatively low intensity damage threshold, which in turn reduces laser reliability and limits the laser pulse intensity available.

On the other hand, conventional active Q-switched solid-state lasers can provide nanosecond-duration pulses with high pulse energy, but they deliver only a traditional laser pulse shape (i.e., typical Gaussian shape), with a leading edge rise time that is close to the laser pulse width itself.

Although there are many techniques for generating laser pulses with very short rise times in the range of 1 ns or shorter, such as passive Q-switch or mode locking techniques, the pulse widths are, however, close to the short rise time. More important, the pulse shape is generally fixed for such laser pulses.

SUMMARY OF THE DISCLOSURE

The present disclosure relates to laser pulse shaping techniques that produce tailored laser pulse spectral output. The laser pulses can be programmed to have desired pulse widths and pulse shapes (such as sub-nanosecond to 10 ns-20 ns pulse widths with 1 ns to several nanoseconds leading edge rise times).

Tailored pulses are useful in laser processing applications, such as laser printed circuit board (PCB) via drilling to achieve better throughput and less damage to the PCB copper pads, and laser link processing to reduce risk of generating over-craters in the overlying passivation layer. Preferred embodiments are implemented with one or more electro-optical modulators receiving drive signals that selectively change the amount of incident pulsed laser emission to form a tailored pulse output. Triggering the drive signal from the pulsed laser emission suppresses jitter associated with other stages of the link processing system and substantially removes jitter associated with pulsed laser emission build-up time.

Tailored pulses can be power-scaled for harmonic generation to shorter wavelengths. The pulse shaping techniques offer broad opportunities in processing different materials to meet quality requirements and provide an economical, reliable alternative solution to providing high laser power with the use of fiber lasers.

BRIEF DESCRIPTION OF THE DRAWINGS

FIG. 3A is a simplified block diagram of a laser system employing a fast multi-state (FMS) electro-optical modulator and a pulsed harmonic laser source.

FIG. 3B shows the laser system of FIG. 3A implemented with a preferred pulsed harmonic laser source.

FIG. 4B-1 is a simplified block diagram of a laser system of a type similar to the laser system of FIG. 4A, except for direct coupling of the output of the FMS electro-optical modulator without amplification into the harmonic conversion modulator to produce a tailored pulse output.

FIGS. 4B-2 and 4B-3 depict different pairs of three oscilloscope traces that show the laser output pulse waveforms of the pulsed laser source, FMS electro-optical modulator, and harmonic conversion module of the laser system of FIG. 4B-1.

FIG. 4C is a simplified block diagram of a laser system employing a Q-switched laser and a harmonic conversion modulator that cooperate to form and apply to an FMS electro-optical modulator a frequency-converted laser output for direct production of a tailored pulse output.

FIG. 4D is a simplified block diagram of a laser system employing a master oscillator power amplifier (MOPA) implemented with an electro-optical modulator to produce a fundamental tailored pulse output for subsequent amplification and harmonic conversion to form an amplified tailored pulse output.

FIG. 5A is a simplified block diagram of a laser system employing a MOFPA and an FMS electro-optical modulator in cooperation with a harmonic conversion modulator to produce a tailored pulse output.

FIG. 5B is a simplified block diagram of a laser system of a type similar to the laser system of FIG. 5A, except for interchanged positions of the FMS electro-optical modulator and harmonic conversion modulator to produce direct shaping of a harmonic laser pulse generated by the MOFPA and harmonic conversion modulator.

DETAILED DESCRIPTION OF PREFERRED EMBODIMENTS

Figure 1:
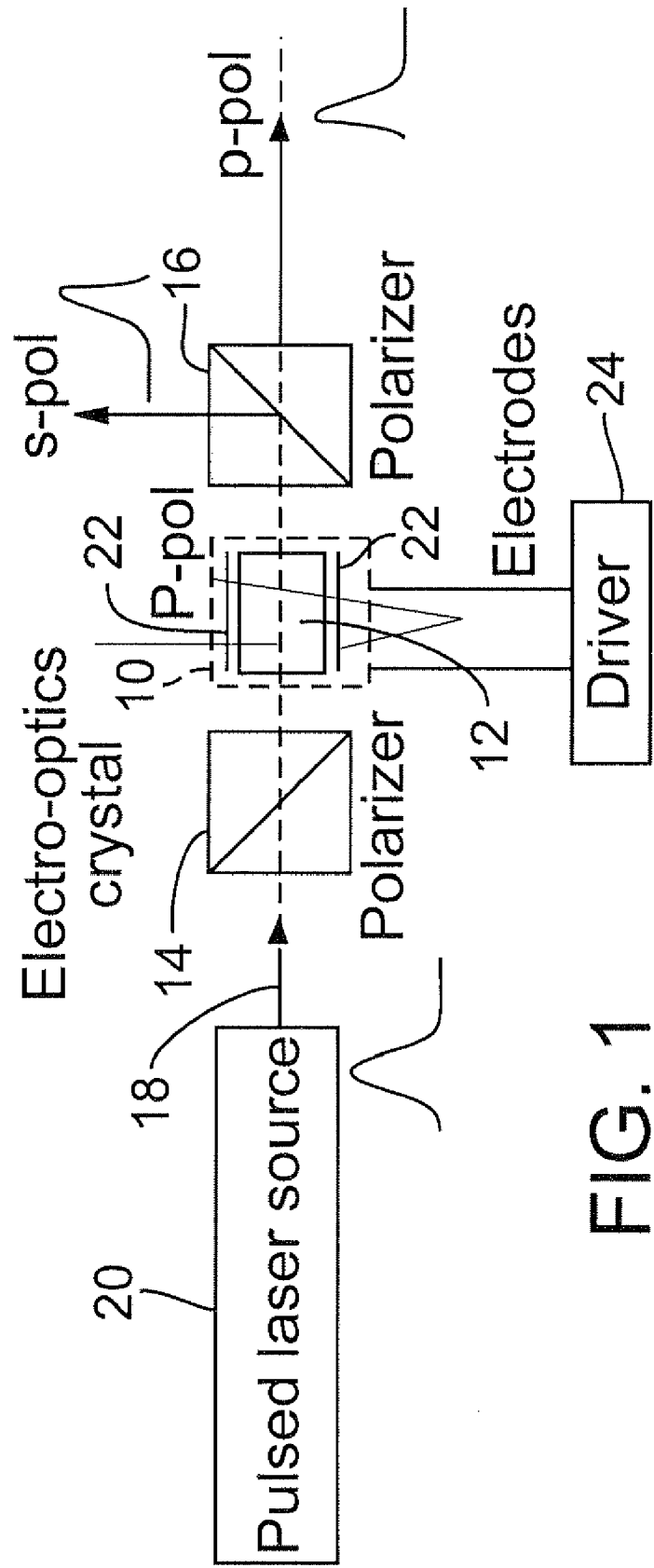
FIG. 1 is a simplified block diagram of an electro-optical modulator operating as a laser pulse slicing device in the production of tailored laser pulse output.

FIG. 1 shows an electro-optical modulator 10 that is implemented in a number of laser pulse slicing system embodiments described below to produce tailored laser pulse output. Electro-optical modulator 10 includes an electro-optical crystal cell 12 that is positioned between light polarizing devices (polarizers) 14 and 16 and receives a beam of laser pulses 18 emitted by a pulsed laser source 20. Electro-optical crystal cell 12 has electrodes 22 to which drive output signals of driver circuitry 24 are applied to contribute to shaping of incident laser pulses 18. Laser source 20 can be any pulsed laser emitting a laser pulse of a pulse width within a range of a few nanoseconds to 100 ns. Electro-optical crystal cell 12 can be made of KDP, KD*P, ADP, AD*P, RTP, RTA, BBO, LiNbO3, or other electro-optical materials. One example of a suitable electro-optical crystal cell 12 is a LightGate 4 BBO Pockels cell manufactured by Cleveland Crystals, Inc., Highland Heights, Ohio. The LightGate 4 cell can operate at 100 KHz, and its geometry minimizes the drive voltage to about 1.3 KV quarter-wave retardation at 355 nm. The LightGate 4 cell has only 4 pf capacitance, which provides a possibility of less than 2 ns rise and fall optical response times. One example of suitable driver circuitry 24 is a high-voltage, fast switching time Pockels cell driver that is available from Bergmann Messegeraete Entwicklung, KG, Murnau, Germany.

A BBO based electro-optical modulator 10 operates as a quarter-wave rotator in response to a quarter-wave drive voltage applied to electrodes 22 of BBO crystal cell 12. Pulsed laser beam 18 passes through polarizer 14 to become p polarized (p pol) as shown. Laser beam 18 travels once through BBO crystal cell 12. When no drive voltage is applied to electrodes 22 of BBO crystal cell 12, the laser pulses remain in the p pol state and pass through polarizer 16. When a quarter-wave drive voltage at the laser wavelength is applied to electrodes 22 of BBO crystal cell 12, the polarization direction of the beam rotates 90 degrees and become s polarized (s pol). When a drive voltage applied to electrodes 22 of BBO crystal cell 12 is between 0 and the quarter-wave voltage, the portion of polarized laser beam 18 transmitted from polarizer 16 is approximately expressed as $$T=\sin^2[(\pi/2)(V/V_{1/2})],$$

where T is the transmission of the laser beam from polarizer 16, V is the voltage applied to electrodes 22 of the electro-optical crystal cell 12, and $V_{1/2}$ is the half-wave voltage.

Figure 2:
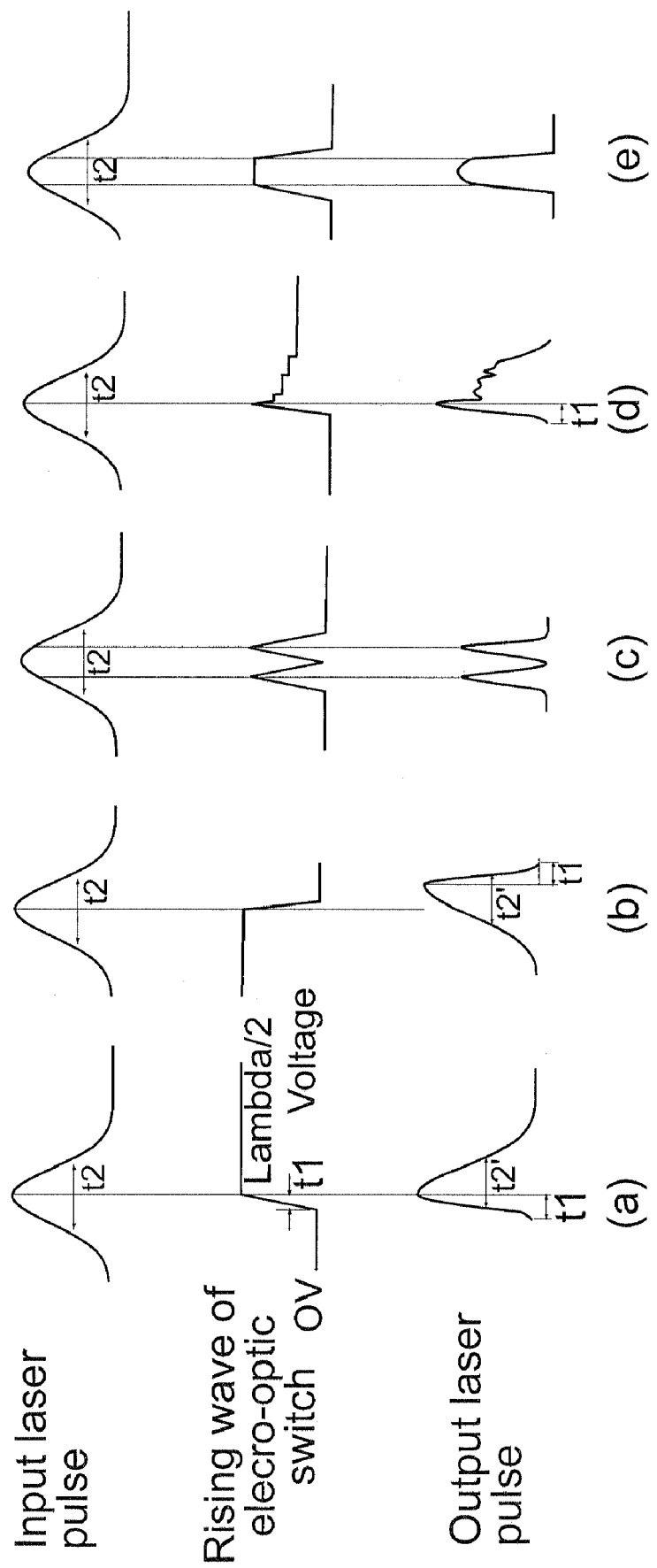
FIG. 2 shows in columns (a), (b), (c), (d), and (e) examples of five possible laser pulse shape formations produced by the laser pulse slicing device of FIG. 1.

Based on the above expression, the controllable transmission, T, of electro-optical modulator 10 provides a laser pulse shaping function. Theoretically, the transmission of electro-optical crystal cell 12 and polarizers 14 and 16 can be about 0%-100%. FIG. 2 shows five examples of possible laser pulse shapes. FIG. 2 shows as column (a) one example of pulse shaping, in which the transmission changes from 0% to 100% with less than a 2 ns rise time for the laser pulse to reach its peak and thereby provide a fast rising leading edge of the laser pulse. Skilled persons will recognize that in an alternative arrangement, known to the art as a double-pass configuration, a quarter-wave voltage may be employed to achieve a desired level of polarization rotation but that this improved efficiency is scheduled gained at the expense of greater optical alignment complexity.

Rise and fall times are related to the voltage and capacitance of the electro-optical cell, the switching time of drive circuit transistors, the repetition rates, and overall electrical power consumption. Lower voltage and capacitance of the electro-optical cell contribute to its fast response time; therefore, selection of a proper material for the electro-optical cell is important. Skilled persons will recognize that BBO and RTP exhibit useful material characteristics for implementation in electro-optical modulators. Koechner, *Solid-State Laser Engineering*, Springer-Verlag, states, for a longitudinal electro-optical cell in which the electric field is applied parallel to the crystal optic axis and in the same direction as the incident light, that phase difference, δ, is related to the applied voltage in a crystal of length, l, by $$\delta=(2\pi/\lambda)n_0^3 r_{63} V_z,$$

where $V_z=E_z l$.

To obtain half-wave retardation, a Pockels cell produces a phase difference δ=π. In this case, for linearly polarized light incident on the Pockels cell, the output beam is also linearly polarized but with a plane of polarization rotated by 90 degrees. By incorporation of polarizing optics well known in the art, the Pockels cell can function as a voltage-controlled optical modulator. Koechner expresses the transmission, T, dependence of such a device as:

$$T=\sin^2[(\pi/2)(V/V_{1/2})],$$

where the half-wave voltage is given by $V_{1/2}=\lambda d/2n_0^3 r_{63}$.

For a transverse electro-optical crystal cell, in which the electric field is applied perpendicularly to the direction of the beam, the half-wave voltage is given by $$V_{1/2}=\lambda d/2n_0^3 r_{63} l.$$

This type of electro-optical crystal cell has the useful attribute that the half-wave voltage depends on the ratio of crystal thickness to length and, by proper selection of these parameters, electro-optical crystal cells may be designed that operate at lower applied voltages than those applied to longitudinal electro-optical crystal cells to achieve a given phase difference.

Skilled persons will recognize that the term $r_{63}$ in the above equations represents the electro-optic coefficient for phosphates of the KDP family. RTP crystal is an important member of this family and is a preferred electro-optical crystal material for the preferred embodiments described for use with 1064 nm laser input. BBO crystal is preferably used with 355 nm laser input.

RTP crystal has a low voltage requirement (about 1.6 KV for π or half-wave retardation and a 3.5 mm aperture) for 1064 nm laser input and can operate to a 10 MHz repetition rate. RTP crystal cannot perform well when the average power is generally more than 10 W or is not suitable for UV applications because of transparency restrictions. For these latter applications as noted above, BBO is preferred. In practice, it is difficult to drive BBO at 100 KHz for 1064 nm laser because of the high voltage requirement (about 6 KV at half-wave retardation). Therefore, the RTP electro-optical crystal cell is the currently preferred choice for a 1064 nm laser, and the BBO electro-optical crystal cell is preferred for 355 nm laser (about 1.3 KV at half-wave retardation for a LightGate 4 BBO Pockels cell). Other electro-optical materials, such as KDP, RTA, and ADP, have main limitations on use at high repetition rates and pulse modulation because of piezo-electric (PE) resonances. Faster rise and fall times result in higher frequency components so there is a greater chance that one of these frequency components will fall into the principal resonance frequencies. This is especially true of a fast rise time tailored pulse, which contains many frequency components that extend in frequency well above the fundamental repetition rate.

To generate tailored pulse shapes, the preferred embodiments described are implemented with a "fast multi-state" (FMS) electro-optical modulator that is designed to avoid PE resonances. For 1064 nm laser output, this is accomplished by using an electro-optical cell made of RTP crystal material and short electrical pulses, which do not generate significant PE resonances. Pulse lengths on the order of nanoseconds result in relatively low PE resonances. For example, an RTP electro-optical crystal cell can reach a repetition rate of 10 MHz for 5% duty cycle pulses.

Another concern of obtaining fast rising and falling time is the design of the electro-optical modulator driver. There is no actual limitation of an electro-optical crystal cell preventing it from producing sub-nanosecond or picosecond switching times; therefore, a fast switching time depends mainly on the electrical driver. Skilled persons recognize that there are two principal types of electrical switchers: avalanche transistor and MOSFET. The transistors operate within a very limited voltage range to attain the fastest switching time. A stack of 7 to 10 transistors may be used to operate in the 1.6 KV range. Avalanche transistors can achieve a 2 ns switching time, but their repetition rates are limited to less than 10 KHz. For higher repetition rates, MOSFETs are currently preferred, because, generally, they have a 1 ns response time and maximum 1 KV operating voltage. A stack of at least 2 to 3 MOSFETs is used to operate in the 1.6 KV range.

The selection of MOSFETs and circuit design are, therefore, germane to accomplish FMS pulse modulation, In particular, the driver circuit power consumption is of concern because it is proportional to the square of the peak operating voltage. For example, a BBO electro-optical cell operating at about 6 KV requires approximately 14 times as much power consumption as that of an RTP electro-optical cell operating at 1.6 KV to achieve a comparable phase shift at a given repetition rate. Skilled persons will recognize that lowering the operating voltage reduces the power consumption. It is possible to reduce the number of MOSFETs, which in turn provides better performance of FMS pulse modulation through judicious choice of the aperture size and resulting drive voltage. In a preferred embodiment of a transverse electro-optical modulator, a reduction in the apertures of RTP and BBO electro-optical crystal cells to about 2 mm gives corresponding reductions in half-wave retardation voltages to about 800 V and 4 KV at 1064 nm, for RTP and BBO electro-optical crystal cells, respectively.

An FMS electro-optical modulator is capable of multiple programmable steps of modulation, in which each step has a rise time of preferably less than about 4 ns and a fall time of preferably less than about 4 ns, and more preferably, in which each step has a rise time of preferably less than about 2 ns and a fall time of preferably less than about 2 ns. An operational advantage of the disclosed embodiments is that they provide a tailored pulse shape that may be programmed to have more than one amplitude value. Another such operational advantage is the capability of providing programmable tailored pulse shapes with discrete amplitude and time duration components. Such capability is particularly useful in the production of tailored pulse output with a pulse shape of the type shown in FIG. 2(a). This pulse shape has, with respect to the first amplitude maximum, a total fall time that is substantially longer than the rise time to the first amplitude maximum.

FIG. 3A shows a simplified block diagram of a preferred embodiment of a laser system 30 employing an FMS electro-optical modulator 10 and a pulsed harmonic laser source 34. Laser system 30 can generate tailored harmonic output pulse shapes from harmonic laser pulse input of substantially Gaussian, rectangular, or trapezoidal pulse shapes. Such tailored harmonic pulse shape output may be advantageously employed to sever electrically conductive link structures in a wide array of semiconductor memory devices, including DRAM, SRAM, and flash memory; to produce laser drilled micro-vias in flexible circuits, such as copper/polyamide layered materials, and in integrated circuit (IC) packages; to accomplish laser processing or micromachining of semiconductors, such as laser scribing or dicing of semiconductor integrated circuits, silicon wafers, and solar cells; and to accomplish laser micromachining of metals, dielectrics, polymeric materials, and plastics.

FIG. 3B shows a preferred implementation of pulsed harmonic laser source 34 used in laser system 30 of FIG. 3A, Pulsed harmonic laser source 34 may be a diode-pumped, Q-switched Nd:YVO$_4$ master oscillator 36 operating at 1064 nm, the output (denoted schematically as $\lambda_1$, $P_1(t)$) of which is amplified in a diode-pumped Nd:YVO$_4$ amplifier 38, also operating at 1064 nm. The amplified 1064 nm output (denoted schematically as $\lambda_1$, $P_2(t)$) is subsequently frequency converted to 355 nm in an extracavity harmonic module 40, the output of which is denoted schematically as $\lambda_2$, $P_3(t)$. Extracavity harmonic module 40 includes an optional first focusing lens; a Type I, non-critical phase-matched LBO cut for 1064 nm to 532 nm conversion; an optional second focusing lens; and a Type II, sum frequency generation LBO crystal cut for 1064 nm plus 532 nm to 355 nm harmonic conversion. This exemplary configuration includes steering optics and dichroic beam splitting elements, of which configurations and implementation methods are well known to skilled persons. The output (denoted schematically as $\lambda_2$, $P_3(t)$) of pulsed harmonic source 34 is coupled into FMS electro-optical modulator 10 to produce tailored pulse shape output (denoted schematically as $\lambda_2$, $P_4(t)$) at a third harmonic wavelength of 355 nm.

Skilled persons will recognize that an FMS electro-optical modulator 10 can operate efficiently at harmonic wavelengths because the applied voltage for the same polarization change is one-half for the second harmonic and one-third for the third harmonic. This effect allows the beneficial reduction of rise and fall times with respect to similar systems operating at the fundamental wavelength because the rise time of the drive voltage is slow-rate limited and modulation of shorter wavelength is achieved at lower drive voltages.

Figure 4A:
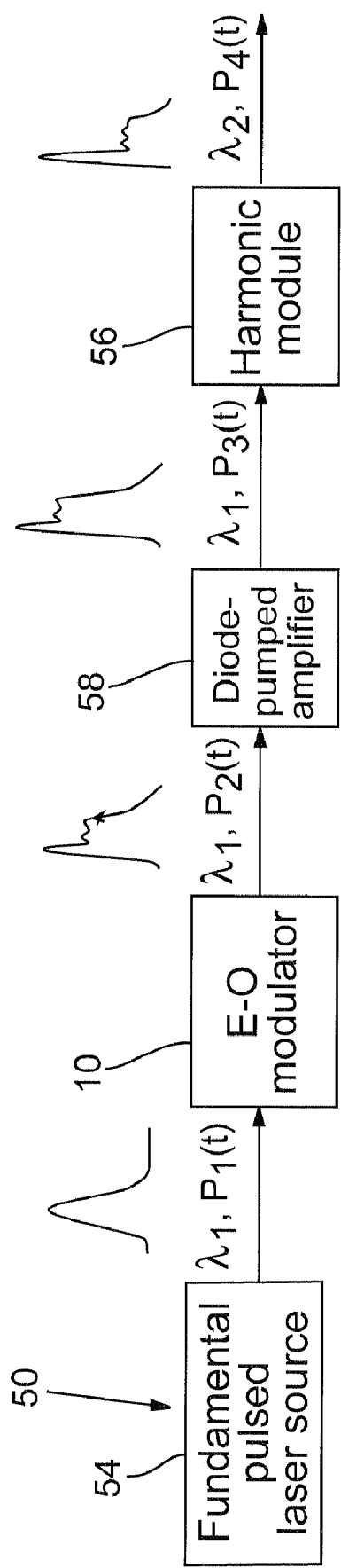
FIG. 4A is a simplified block diagram of a laser system employing an FMS electro-optical modulator and a fundamental pulsed laser source in cooperation with a diode-pumped amplifier and a harmonic conversion modulator to produce a tailored pulse output.

FIG. 4A shows a simplified block diagram of a preferred embodiment of a laser system 50 employing FMS electro-optical modulator 10 and a fundamental pulsed laser source 54 in cooperation with a harmonic modulator 56 to produce a desired output by nonlinear conversion of a shaped laser pulse. Pulsed laser source 54 operating at a first center or fundamental wavelength delivers substantially Gaussian, rectangular, or trapezoidal pulse shape output (denoted schematically as $\lambda_1$, $P_1(t)$) to FMS electro-optical modulator 10. FMS electro-optical modulator 10 is programmed to modify the input pulse shape to a first tailored pulse shape output (denoted schematically as $\lambda_1$, $P_2(t)$) that is suitable for subsequent amplification by a diode-pumped Nd:YVO$_4$ power amplifier 58 and subsequent conversion to harmonic output. To generate the harmonic output, an amplified fundamental wavelength tailored pulse shape output (denoted schematically as $\lambda_1$, $P_3(t)$) produced by diode-pumped power amplifier 58 operating at 1064 nm is delivered to a harmonic conversion module 56. Harmonic conversion module 56 converts amplified fundamental wavelength tailored pulse shape output to harmonic tailored pulse shape output (denoted schematically as $\lambda_2$, $P_4(t)$) at a second center or harmonic wavelength of 355 nm. As shown in FIG. 4A, because of the characteristics of the harmonic conversion process, the conversion of $\lambda_2$, $P_3(t)$ to $\lambda_2$, $P_4(t)$ depends strongly on the temporal dependence of the pulse shape amplitude, as is well known to skilled persons. Skilled persons will recognize that second, fourth, or fifth harmonics may be produced through alternative arrangements of optical elements and harmonic crystals. Harmonic conversion processes are described in V. G. Dmitriev, et al., *Handbook of Nonlinear Optical Crystals*, pp. 138-141. In an alternative embodiment, diode-pumped power amplifier 58 may be replaced by a diode-pumped large mode area fiber power amplifier or a diode-pumped photonic crystal fiber power amplifier.

Figures 1, 4B:
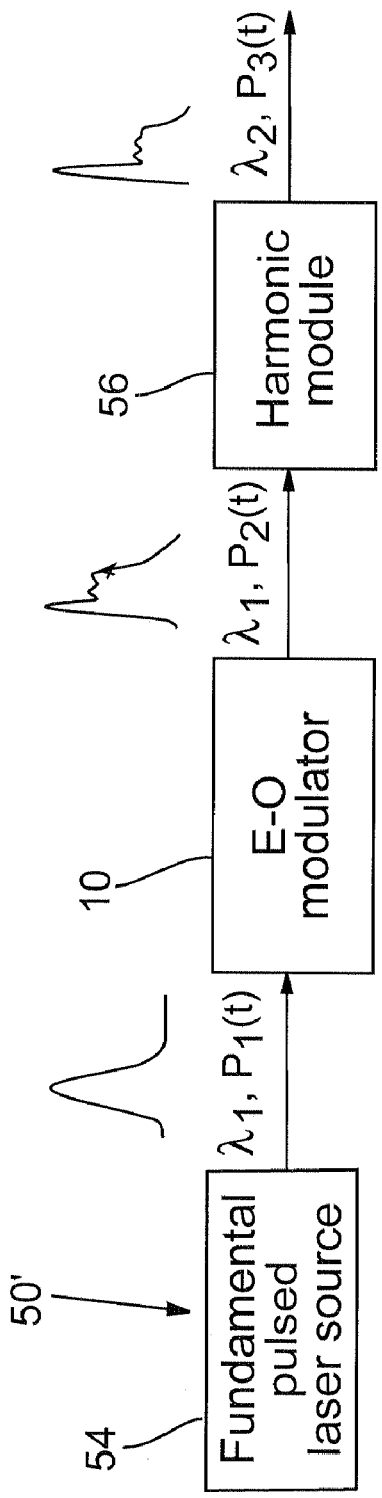
Figures 2, 4B:
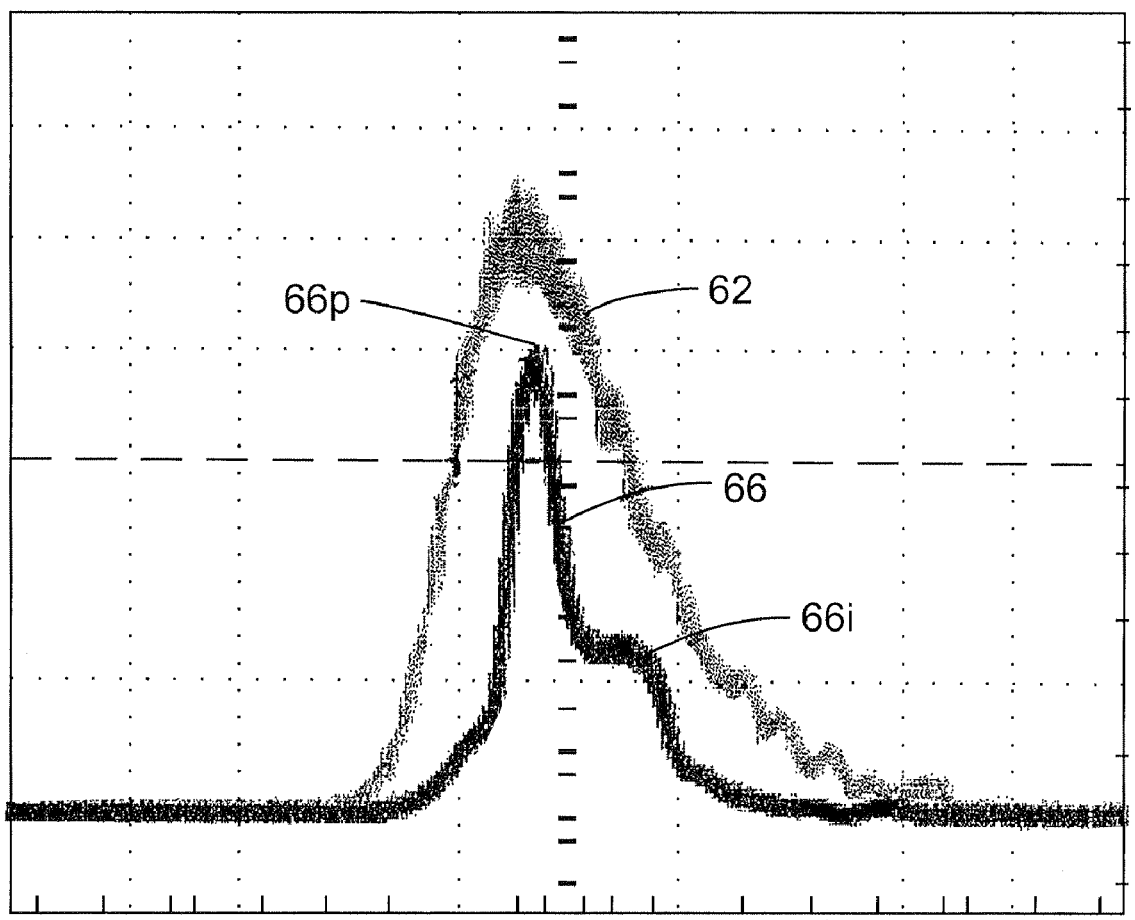
Figures 3, 4B:
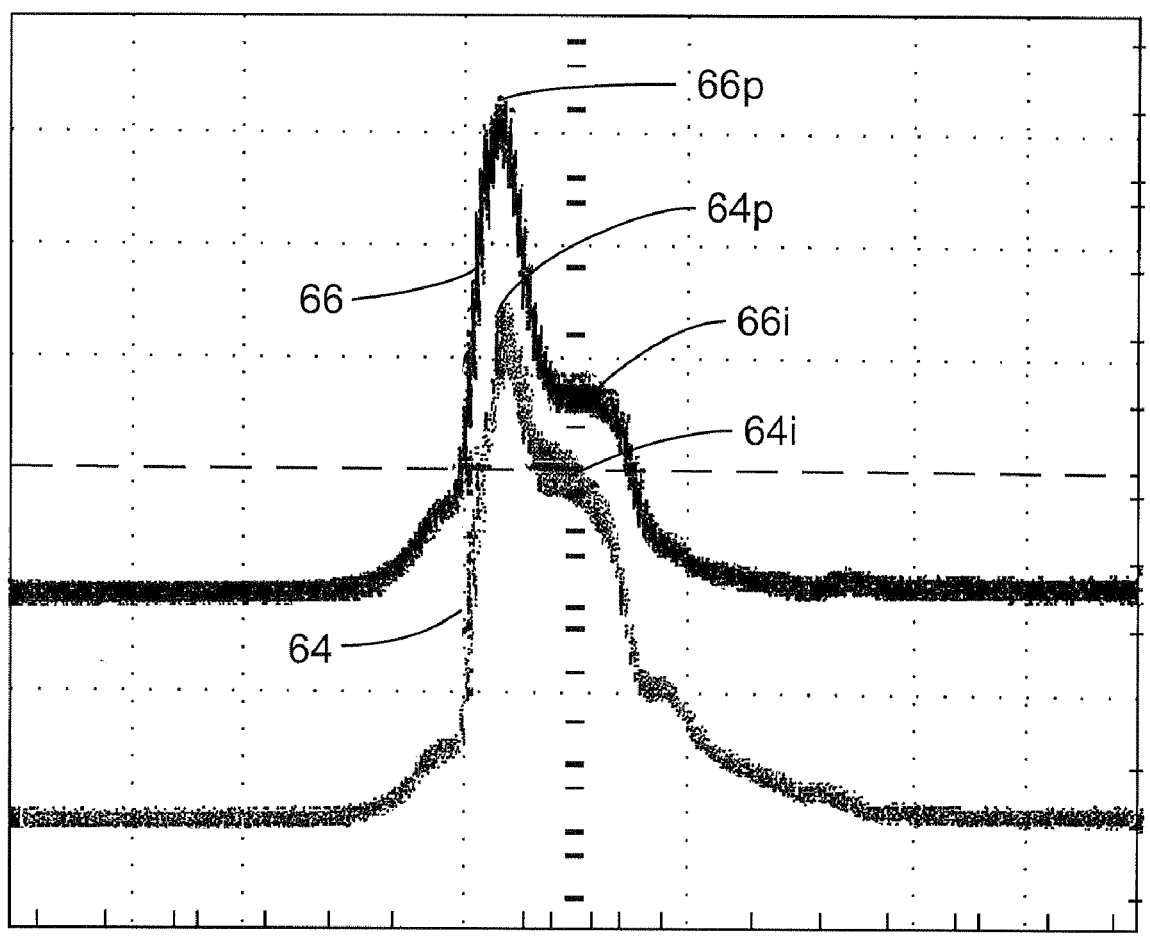

FIG. 4B-1 shows, as a first alternative embodiment, a laser system 50' in which the first tailored fundamental output of FMS electro-optical modulator 10 is directly coupled into harmonic conversion module 56 without amplification. A description of this temporal dependence effect is given in V. G. Dmitriev, et al., *Handbook of Nonlinear Optical Crystals*, pp. 1-51. Applicants refer specifically to FIG. 2.13, which is illustrative of the dependence of harmonic pulse shape generation on the input pulse shape temporal amplitude distribution. FIGS. 4B-2 and 4B-3 depict different pairs of three oscilloscope screen traces superimposed to show the laser output pulse waveforms 62, 64, and 66 of, respectively, pulsed laser source 54, FMS electro-optical modulator 10, and harmonic conversion module 56 of FIG. 4B-1.

FIG. 4B-2 depicts the temporal relationship of tailored deep UV (266 nm) output pulse waveform 66 and pulsed green (532 nm) laser output waveform 62, and FIG. 4B-3 depicts the temporal relationship of deep UV (266 nm) output pulse waveform 66 and tailored green (532 nm) output pulse waveform 64. FIG. 4B-3 shows that the height of a peak amplitude 66p measured from a relatively flat intermediate portion 66i of waveform 66 is significantly greater than the height of a peak amplitude 64p measured from a relatively flat intermediate portion 64i of waveform 64. The significant difference between peak amplitude 66p and peak amplitude 64p stems from the nonlinear harmonic conversion process performed by harmonic conversion module 56, in which $P_3(t)$ is proportional to $P_2^2(t)$. Precompensation for the nonlinear effect of harmonic conversion on peak amplitude 66p of tailored output pulse waveform 66 entails judicious timing of sequencing of the drive output signals of driver circuitry 24 applied to electrodes 22 of electro-optical modulator 10. The sequence of drive signals produces the multiple states of output transmission of modulator 10 to form tailored green output pulse waveform 64 of a shape that precompensates for the nonlinear effects to produce tailored deep UV output pulse waveform 66 of a desired shape.

FIG. 4C shows, as a second alternative embodiment, a laser system 50'' in which pulsed laser source 54 is diode-pumped, Q-switched Nd:YVO$_4$ laser 54 operating at 1064 nm, the output (denoted schematically as $\lambda_1$, $P_1(t)$) of which is then applied to extracavity harmonic conversion module 56 and subsequently converted to harmonic non-tailored pulse shape output (denoted schematically as $\lambda_2$, $P_2(t)$) at a harmonic wavelength of 355 nm. The harmonic non-tailored pulse shape output is then coupled into FMS electro-optical modulator 10 to produce harmonic tailored pulse shape output (denoted schematically as $\lambda_2$, $P_3(t)$) at a harmonic wavelength of 355 nm.

FIG. 4D shows, as a third alternative embodiment, a laser system 50''' in which output (denoted schematically as $\lambda_1$, $P_1(t)$) of fundamental pulsed laser source 54, which is a diode-pumped, Q-switched Nd:YVO$_4$ laser operating at 1064 nm is coupled into FMS electro-optical modulator 10 to produce first fundamental tailored pulse shape output (denoted schematically as $\lambda_1$, $P_2(t)$). First fundamental tailored pulse shape output is then amplified in a diode-pumped fiber or solid state amplifier 58 to produce amplified fundamental tailored pulse shape output (denoted schematically as $\lambda_1$, $P_3(t)$). A preferred embodiment of diode-pumped solid state amplifier 58 is a diode-pumped Nd:YVO$_4$ amplifier. Alternatively, diode-pumped power amplifier 58 may be replaced by a diode-pumped large mode area fiber power amplifier or a diode-pumped photonic crystal fiber power amplifier. Tailored pulse shaped output $\lambda_1$, $P_3(t)$ may subsequently be amplified in a fiber or diode-pumped solid state power amplifier 68 to produce second, amplified tailored pulse shaped output (denoted $\lambda_1$, $P_4(t)$), which is then applied to extracavity harmonic conversion module 56 and subsequently converted to harmonic tailored pulse shape output (denoted schematically as $\lambda_2$, $P_5(t)$) at a harmonic wavelength of 355 nm.

FIG. 5A shows a simplified block diagram of a preferred embodiment of laser system 70 employing FMS electro-optical modulator 10 and pulsed laser source that includes a master oscillator fiber power amplifier (MOFPA) 72 with programmable pulse width. Programmable pulse width MOFPA 72 produces an output of typically trapezoidal pulse shape.

MOFPA 72 includes a pulsed seed source 74 and a fiber power amplifier 76. Seed source 74 is a pulsed laser source, such as a Q-switched solid-state laser, or a pulsed semiconductor laser. The laser output from seed source laser (denoted schematically as $\lambda_1$, $P_1(t)$) is delivered to fiber power amplifier 76, which produces MOFPA output (denoted schematically as $\lambda_1$, $P_2(t)$). The MOFPA output is preferably of narrow spectral bandwidth (<1.0 nm) and is well-polarized (>100:1) with excellent spatial mode quality ($M^2$<1.2). Fiber power amplifier 76 is preferably a diode-pumped, rare-earth doped fiber amplifier, and the gain fiber in the diode-pumped rare-earth doped fiber amplifier is preferably a multi-clad large mode area fiber. In another preferred embodiment, the gain fiber is a large mode area photonic crystal fiber, which may be a rod-like large mode area photonic crystal fiber.

The MOFPA output is coupled into FMS electro-optical modulator 10, which is programmed to modify the input pulse shape to a first tailored pulse shape output (denoted schematically as $\lambda_1$, $P_3(t)$) that is suitable for subsequent conversion to harmonic output. The output of FMS electro-optical modulator 10 is applied to and frequency converted in an extracavity harmonic module 78 to harmonic tailored pulse shape output (denoted schematically as $\lambda_2$, $P_4(t)$) at a harmonic wavelength of 355 nm. The pulse repetition frequency of the harmonic tailored pulse shape MOFPA output is preferably greater than about 50 KHz, and more preferably greater than about 150 KHz.

FIG. 5B shows, as an alternative embodiment, a laser system 70' in which pulsed laser source 72 may be a MOFPA, as described above operating at 1064 nm, the output (denoted schematically as $\lambda_1$, $P_1(t)$) of which is applied to extracavity harmonic module 78 and converted to harmonic non-tailored pulse shape output (denoted schematically as $\lambda_2$, $P_2(t)$) at a harmonic wavelength of 355 nm. Harmonic non-tailored pulse shape output is coupled into FMS electro-optical modulator 10 to produce harmonic tailored pulse shape output (denoted schematically as $\lambda_2$, $P_3(t)$) at a harmonic wavelength of 355 nm.

Figure 6:
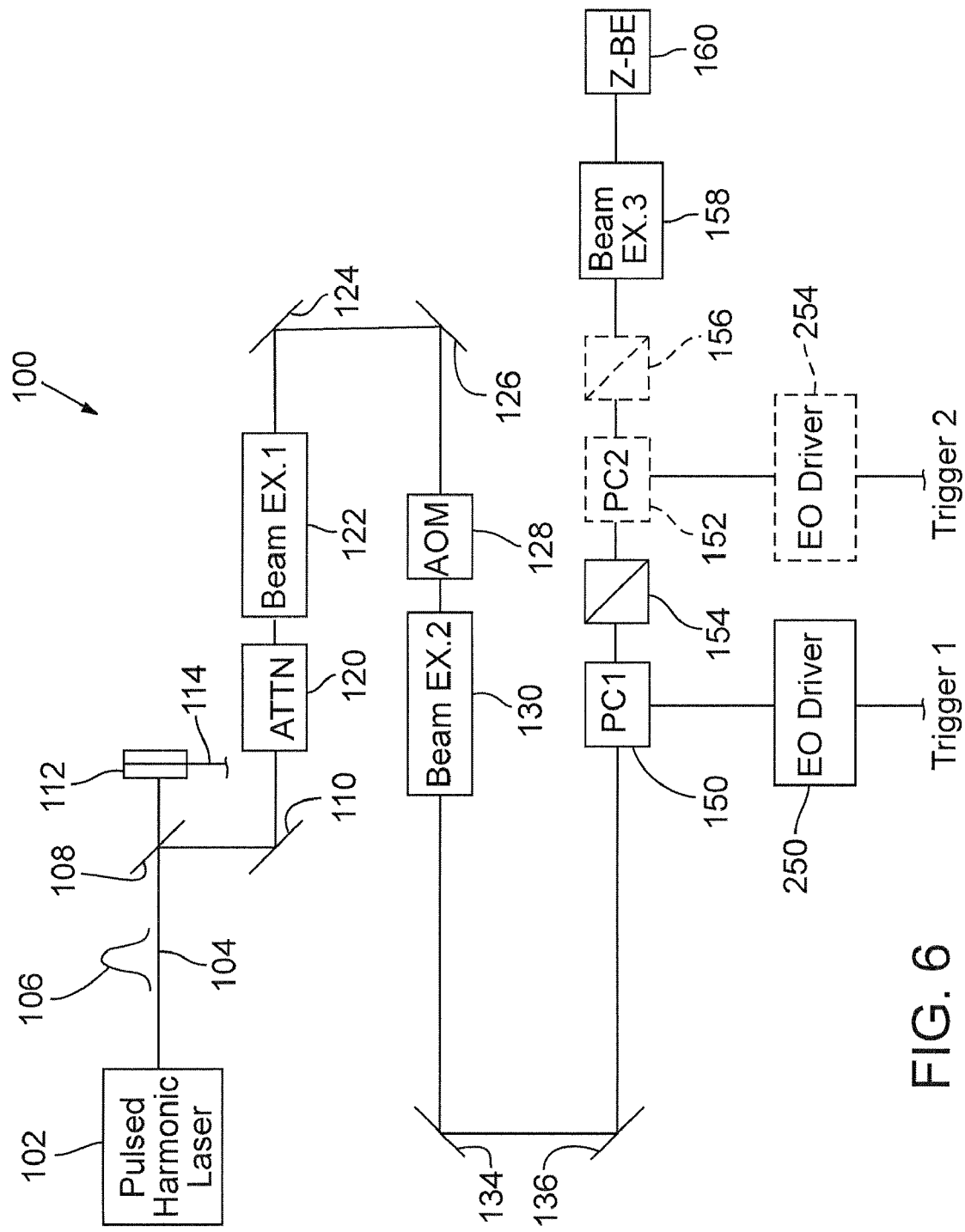
FIG. 6 is a detailed block diagram showing the optical components of a laser system that is implemented with a pulsed harmonic laser source and either one or two FMS electro-optical modulators to produce a desired shaped laser pulse output.

FIG. 6 is a detailed block diagram showing the optical components of a laser system 100 that is implemented with a pulsed harmonic laser source and either one or two FMS electro-optical modulators to produce a desired shaped laser pulse output. With reference to FIG. 6, laser system 100 includes a pulsed harmonic laser source 102 of preferably an intra-cavity UV DPSS laser type that emits a 355 nm pulsed laser output beam 104. One of laser pulses 106 of output beam 104 is shown at the output of laser source 102. A suitable laser source 102 is a Tristar™ 2000 UV laser, which is manufactured by the Spectra-Physics division of Newport Corporation, Irvine, Calif., and emits about 1 W of 355 nm power at a 100 KHz repetition rate and an 18 ns pulse width. Laser beam 104 is incident on a highly reflective mirror 108, which directs almost all of the incident laser beam energy to a second highly reflective mirror 110 and provides a leakage amount of the incident laser beam energy to an optical detector 112 that produces a detector output signal 114. A suitable optical detector 112 is a Hamamatsu S3279 photodiode, manufactured by Hamamatsu Photonics KK, Hamamatsu City, Japan. Detector output signal 114 is delivered to each of three embodiments of electro-optical modulator drive circuitry, as further described below.

Laser beam 104 reflected by mirror 110 propagates through a manually adjustable attenuator 120 and a first beam expander 122, reflects off of highly reflective beam steering mirrors 124 and 126, and strikes the input of an acousto-optic modulator (AOM) 128 functioning as an electrically controlled attenuator. Laser beam 104 exiting AOM 128 propagates through a second beam expander 130.

In a first implementation of laser system 100, laser beam 104 propagates from second beam expander 130 and, after reflection from reflectors 134 and 136, is incident on optically series-connected electro-optical modulators 150 and 152, the outputs of which are optically associated with respective polarizers 154 and 156. A suitable electro-optical modulator 150 or 152 is the LightGate 4 BBO Pockels cell described above. Electro-optical modulators 150 and 152 receive drive control output signals from electro-optical modulator drive circuitry 210 (FIG. 7) to produce tailored pulse output that propagates through a beam expander 158 and then through a zoom beam expander 160 to provide a programmable laser beam spot for delivery to the system optical components.

In second and third implementations of laser system 100, electro-optical modulator 152 and its associated polarizer 156 are absent and laser beam 104 propagates through electro-optical modulator 150 and its associated polarizer 154 to zoom beam expander 160. Electro-optical modulator 150 receives a drive control output signal from electro-optical modulator drive circuitry 310 (FIG. 9) for the second implementation and from electro-optical modulator drive circuitry 410 (FIG. 11) for the third implementation. The following descriptions of the three embodiments of electro-optical modulator drive circuitry 210, 310, and 410 enabling the three implementations of laser system 100 present in detail the synthesis of tailored laser pulse temporal profiles.

Figure 7:
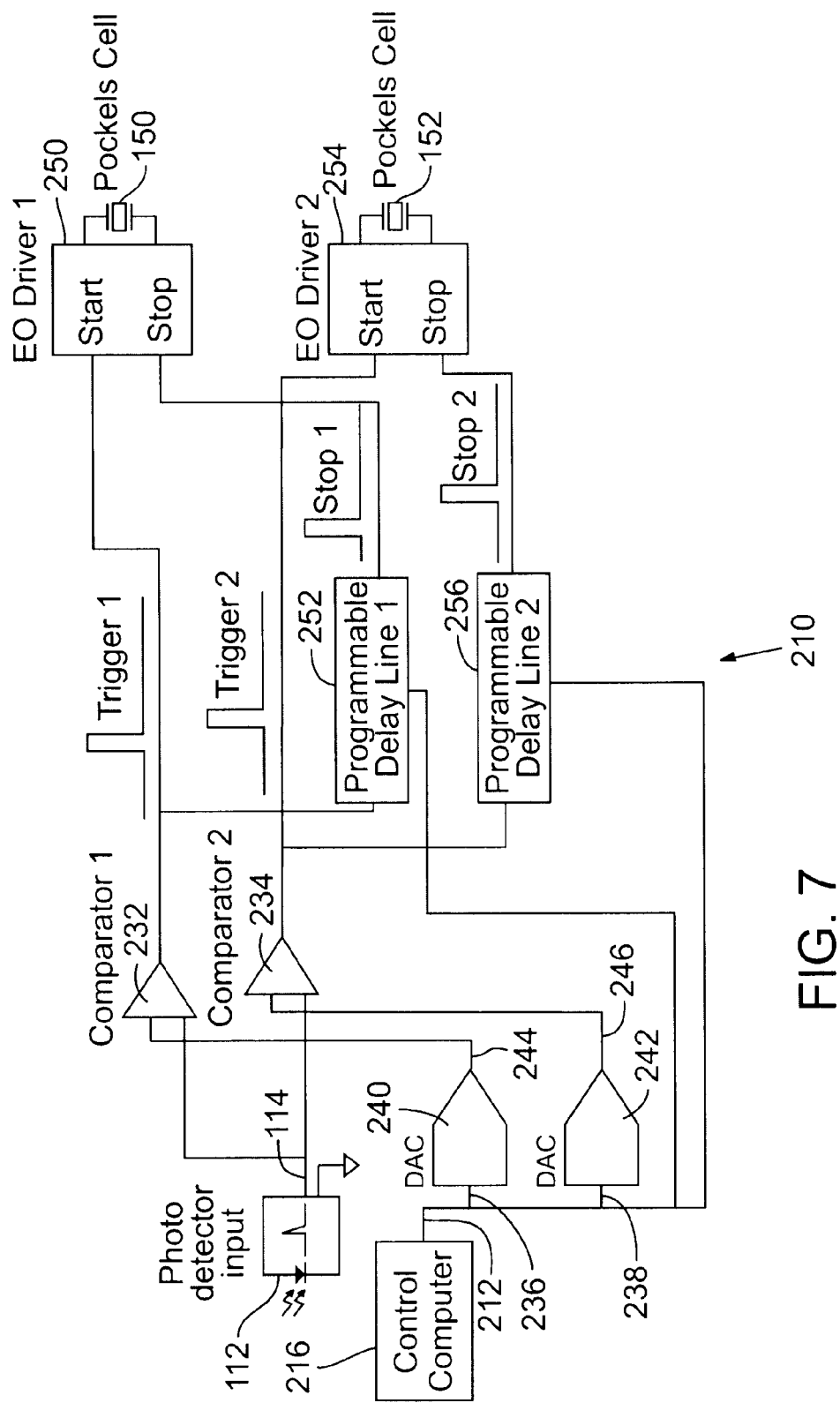
FIG. 7 shows, as a first embodiment, electro-optical modulator drive circuitry that provides drive control output signals to two electro-optical modulators, which in response produce multiple states of output transmission and thereby tailored pulse output.

FIG. 7 shows, as a first embodiment, electro-optical modulator drive circuitry 210 that provides drive control output signals to electro-optical modulators 150 and 152, which in response produce multiple states of output transmission and thereby tailored pulse output exhibiting a tailored pulse temporal profile. Drive circuitry 210 receives as inputs detector output signal 114 of optical detector 112 and control command output 212 from a control computer 216. Control command output 212 includes trigger thresholds set by control computer 216 for comparison to the changing value of detector output signal 114. Comparison of trigger thresholds to detector output signal 114 produced in response to occurrence of the pulsed laser emission underlies the operation of drive circuit 210. Detector output signal 114 synchronizes the production of multiple states of output transmission to the occurrence of the pulsed laser emission and the control command output contributing to sequencing of the production of multiple states of output transmission of the pulsed laser emission. Such synchronization suppresses introduction of contributions of jitter resulting from effects of the indeterminate energy build-up of laser pulse energy and signal jitter of the laser pulse firing signal in the production of multiple states of output transmission forming the tailored pulse output.

Figure 8:
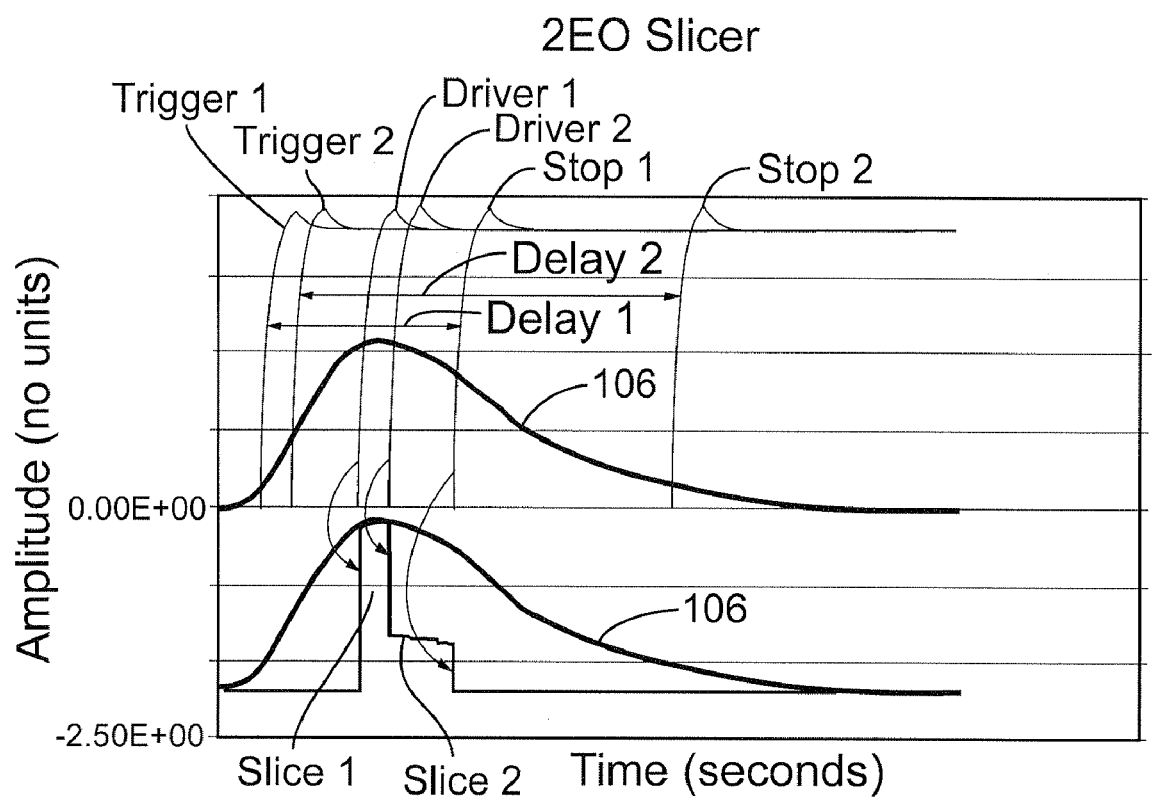
FIG. 8 shows the timing sequence of the signal waveforms produced and the consequent states of output transmission of the electro-optical modulators driven by the drive circuitry of FIG. 7.

The following description of the components and operation of drive circuit 210 is presented with reference to FIG. 7 and FIG. 8, the latter of which showing the timing sequence of the signal waveforms produced and the consequent states of output transmission of electro-optical modulators 150 and 152. Detector output signal 114 is applied to the signal input of each of a first voltage comparator 232 and a second voltage comparator 234. Control command output 212 includes a lower trigger threshold signal 236 and a higher trigger threshold signal 238, which are applied to the respective inputs of digital-to-analog converters (DACs) 240 and 242. A lower threshold voltage output 244 of DAC 240 is applied to the voltage threshold input of first comparator 232, and a higher threshold voltage output 246 of DAC 242 is applied to the voltage threshold input of second comparator 234.

FIGS. 7 and 8 show a Trigger1 signal and a Trigger2 signal that appear at, respectively, the output of comparator 232 and the output of comparator 234. FIG. 8 shows, for purposes of clarity, juxtaposed depictions of laser pulse 106 and the threshold voltages of DAC outputs 244 and 246. The Trigger1 output of comparator 232 is applied to a Start input of a first EO driver 250 and a signal input of a programmable delay line 252. A Stop1 output of delay line 252, which represents a time-displaced version of the Trigger1 output, is applied to a Stop input of first EO driver 250. Similarly, the Trigger2 output of comparator 234 is applied to a Start input of a second EO driver 254 and a signal input of a programmable delay line 256. A Stop2 output of delay line 256, which represents a time-displaced version of the Trigger2 output, is applied to a Stop input of second EO driver 254.

FIGS. 7 and 8 show a Stop1 signal and a Stop2 signal that appear at, respectively, the output of delay line 252 and the output of delay line 256. FIG. 8 (upper traces) shows Delay1 as the time delay between the rising edges of the Trigger1 and Stop1 signals and Delay2 as the time delay between the rising edges of the Trigger2 and Stop2 signals. The amounts of Delay1 and Delay2 are established by delay preset values delivered on control command output 212 that is applied to the delay preset inputs of the respective programmable delay lines 252 and 256. At the beginning of Delay1, the rising edge of the Trigger1 signal produces at the output of first EO driver 250 a Driver1 delay signal transition to a voltage to which electro-optic modulator 150 responds by switching from a lower output transmission state to a higher output transmission state of the pulsed laser emission. FIG. 8 (lower trace) shows the effect on the pulsed laser emission that results from the transition by first EO driver 250 producing the lower to higher output transmission. The arrow between Driver1 (upper trace) and the first rising edge of Slice1 (lower trace) indicates this effect. During Delay1 and at the beginning of Delay2, the rising edge of the Trigger2 signal produces at the output of second EO driver 254 a Driver2 delay signal transition to a voltage to which electro-optic modulator 152 responds by switching from a higher output transmission state to an intermediate output transmission state of the pulsed laser emission. The intermediate output transmission state is between the higher and lower output transmission states. FIG. 8 (lower trace) shows the effect on the pulsed laser emission that results from the transition by the second EO driver 254 producing the higher to intermediate output transmission. The arrow between Driver2 (upper trace) and the first falling edge of Slice2 (lower trace) indicates this effect.

Delay1 ends upon the rising edge of the Stop1 signal, which is the result of the delay produced by delay line 252. The end of Delay1 produces a Driver1 delay signal transition to a voltage to which electro-optic modulator 150 responds by switching from the higher output transmission state to the lower output transmission state. FIG. 8 (lower trace) shows the effect of the transition by first EO driver 250 from higher to lower output transmission on the pulsed laser emission. The arrow between Stop1 (upper trace) and the second falling edge of Slice2 (lower trace) indicates this effect.

Finally, Delay2 ends upon the rising edge of the Stop2 signal, which is the result of the delay produced by delay line 256. The end of Delay2 produces a Driver2 delay signal transition to a voltage to which electro-optic modulator 152 responds by switching from the intermediate output transmission state to the higher output transmission state. The timing of the return of electro-optic modulator 152 to the higher output transmission state is not critical, so long as the transition takes place after the rising edge of the Stop1 signal and before the next laser pulse emission reaches electro-optic modulator 150. In practice, the transition happens after the laser pulse emission is completed insofar as the lower output transmission state of electro-optic modulator 150 is likely to be greater than zero.

Figure 9:
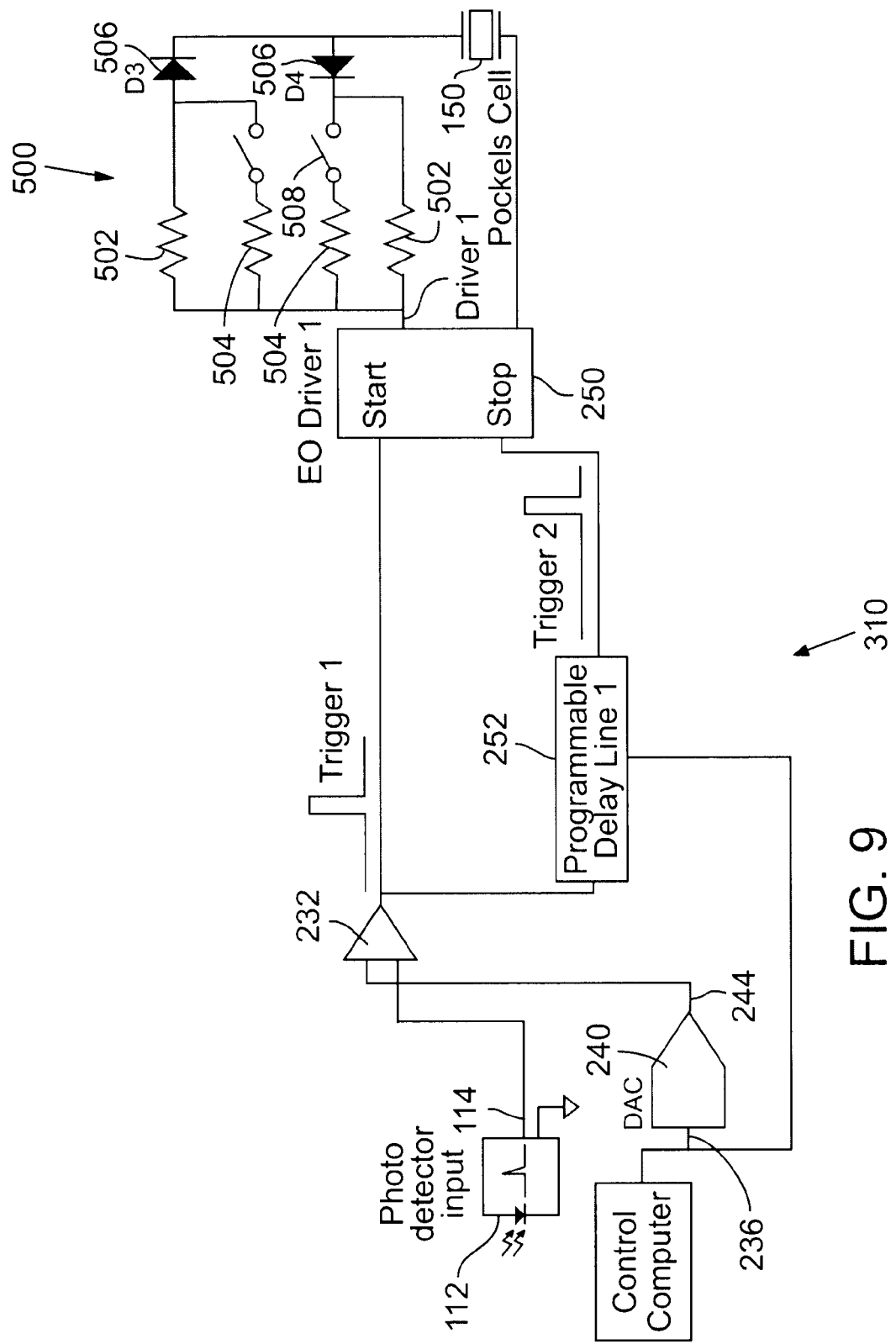
FIG. 9 shows, as a second embodiment, electro-optical modulator drive circuitry that provides a drive control output signal to one of the electro-optical modulators of the system of FIG. 6, which in response produces multiple states of output transmission and thereby tailored pulse output.
Figure 11:
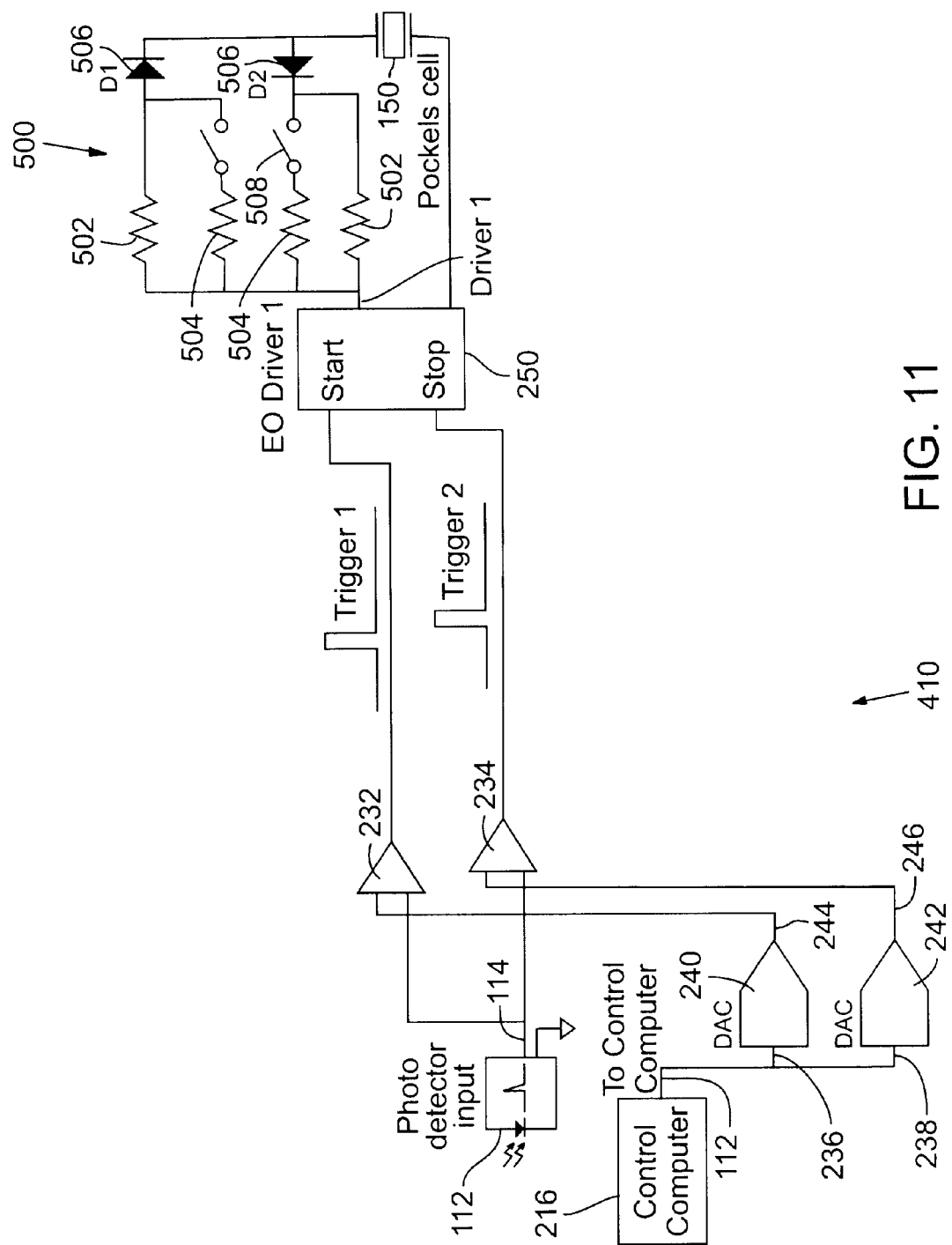
FIG. 11 shows, as a third embodiment, electro-optical modulator drive circuitry that provides a drive control output signal to one of the electro-optical modulators of the system of FIG. 6, which in response produces multiple states of output transmission and thereby tailored pulse output.

FIGS. 9 and 11 show, as second and third embodiments, respective electro-optical modulator drive circuitry 310 and 410 that each provide a drive control output signal to electro-optical modulator 150, which in response produces multiple states of output transmission and thereby tailored pulse output exhibiting a tailored pulse temporal profile. (FIG. 6 shows in laser system 100 electro-optical modulator 152, polarizer 156, and EO driver 254 in dashed lines to indicate omission of them in connection with the embodiments of FIGS. 9 and 11.)

Figure 10:
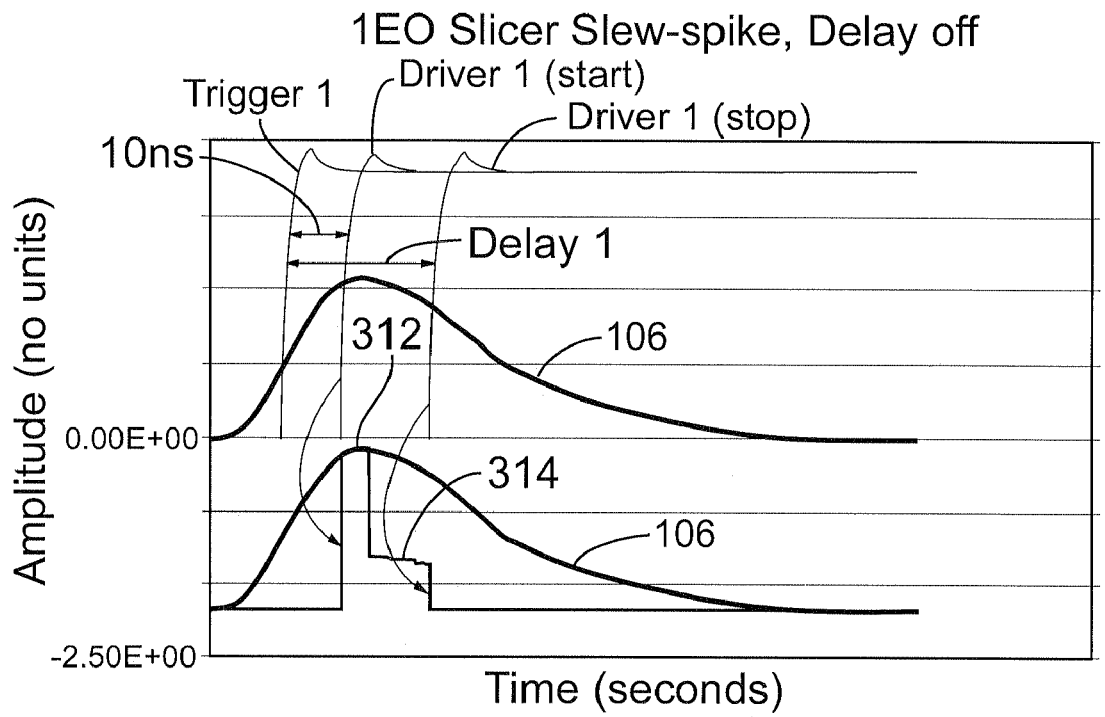
FIG. 10 shows the timing sequence of the signal waveforms produced and the consequent states of output transmission of the electro-optical modulator driven by the drive circuitry of FIG. 9.

The following description of the components and operation of drive circuitry 310 is presented with reference to FIG. 9 and FIG. 10, the latter of which showing the timing sequence of the signal waveforms produced and the consequent states of output transmission of electro-optical modulator 150. Drive circuitry 310 receives as inputs detector output signal 114 of optical detector 112 and control command output 212 from control computer 216. Detector output signal 114 is applied to the signal input of voltage comparator 232. Control command output 212 includes trigger threshold signal 236, which is applied to the input of digital-to-analog converter (DAC) 240, and a delay preset value, which is applied to the delay preset input of programmable delay line 252.

FIGS. 9 and 10 show a Trigger1 signal that appears at the output of comparator 232. FIG. 9 shows laser pulse 106 and the threshold voltage of DAC output 244. The Trigger1 output of comparator 232 is applied to the Start input of EO driver 250 and the signal input of programmable delay line 252. The Trigger2 output of delay line 252, which represents a time-displaced version of the Trigger1 output, is applied to the Stop input of EO driver 250.

FIG. 10 (upper traces) shows Delay1 as the time delay between the rising edges of the Trigger1 and Trigger2 signals. About 10 ns after the rising edge of the Trigger1 signal, EO driver 250 produces at its output Driver1 (Start) a signal transition to a voltage to which electro-optic modulator 150 responds by switching from a minimum output transmission state to a maximum output transmission state, and thereafter to an intermediate output transmission state, of the pulsed laser emission. (The 10 ns delay from Trigger1 to Driver1 (Start) represents a circuit delay inherent in EO driver 250.) The intermediate output transmission state is between the maximum and minimum output transmission states. This switching sequence of output transmission states is achieved by a voltage level appearing at the output of EO driver 250 that drives electro-optic modulator 150 to a voltage overdrive condition. To reach the voltage overdrive condition, electro-optical modulator 150 slews through the maximum output transmission state, to form a high amplitude portion 312 of the pulsed laser emission, and then to the intermediate output transmission state, to dwell there for a time to form the flat amplitude portion 314 of the pulsed laser emission. FIG. 10 (lower trace) shows the effect on the pulsed laser emission that results from the transition by EO driver 250 producing minimum to maximum output transmission, and thereafter to intermediate output transmission.

Delay1 ends upon the rising edge of the Stop1 signal, which is the result of the delay produced by delay line 252 and the 10 ns circuit delay of EO driver 250. At the end of Delay1, EO driver 250 produces at its output a Driver1 (Stop) signal transition to a voltage to which electro-optic modulator 150 responds by switching from the intermediate output transmission state to the minimum output transmission state. FIG. 10 (lower trace) shows the effect on the pulsed laser emission that results from the transition by EO driver 250 producing intermediate to minimum output transmission. The switching from the intermediate to the maximum output transmission states is achieved by stewing electro-optical modulator 150 back through the maximum output transmission state to the minimum output transmission state to form the second falling edge of the pulsed laser emission. The maximum output transmission state forms at the end of the pulsed laser emission a second peak amplitude portion (not shown in FIG. 10), which should be negligible because of the low energy level of the laser pulse 106 at that time.

Figure 12:
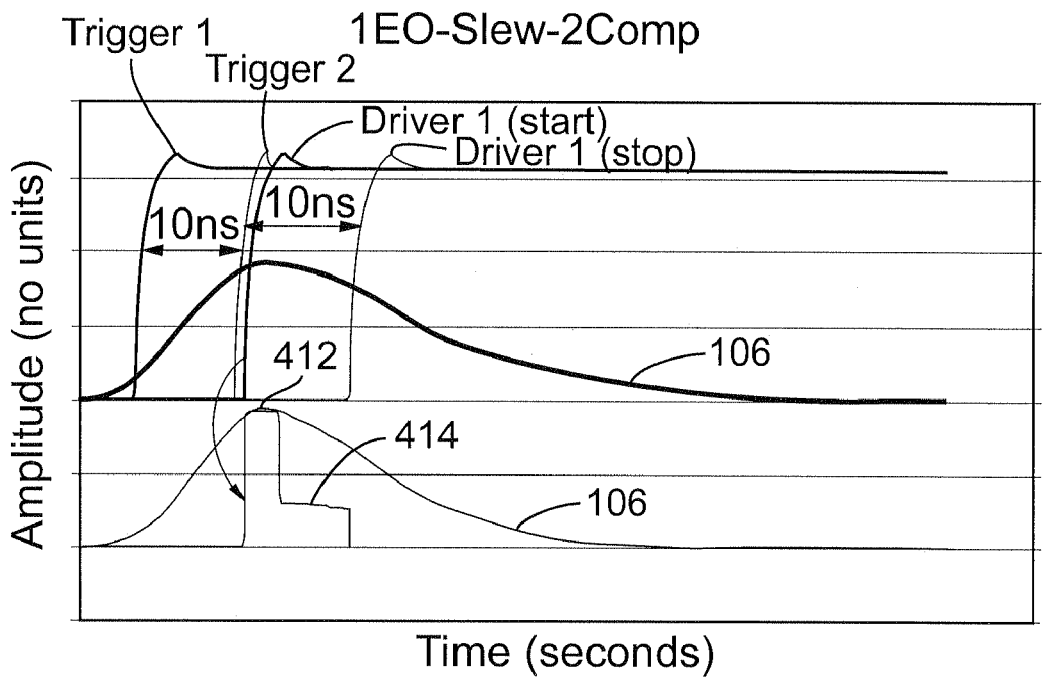
FIG. 12 shows the timing sequence of the signal waveforms produced and the consequent states of output transmission of the electro-optical modulator driven by the drive circuitry of FIG. 11.

The following description of the components and operation of drive circuitry 410 is presented with reference to FIG. 11 and FIG. 12, the latter of which showing the timing sequence of the signal waveforms produced and the consequent states of output transmission of electro-optical modulator 150. Drive circuitry 410 receives as inputs detector output signal 114 of optical detector 112 and control command output 212 from control computer 216. Control command output 212 includes trigger thresholds set by control computer 216 for comparison to the changing value of detector output signal 114. Detector output signal 114 is applied to the signal input of each of first voltage comparator 232 and second voltage comparator 234. Control command output 212 includes a positive-going voltage trigger threshold signal 236 and a negative-going voltage trigger threshold signal 238, which are applied to the respective inputs of digital-to-analog converters (DACs) 240 and 242. A positive-going trigger threshold voltage output 244 of DAC 240 is applied to the voltage threshold input of first comparator 232, and a negative-going trigger threshold voltage output 246 of DAC 242 is applied to the voltage threshold input of second comparator 234.

FIGS. 11 and 12 show Trigger1 and Trigger2 signals that appear at the outputs of comparators 232 and 234, respectively. FIG. 12 shows laser pulse 106 and the threshold voltage of DAC output 244. The Trigger1 output of comparator 232 is applied to the Start input of EO driver 250, and the Trigger2 output of comparator 234 is applied to the Stop input of EO driver 250.

FIG. 12 (upper traces) shows that about 10 ns after the rising edge of the Trigger1 signal, EO driver 250 produces at its output a Driver1 (Start) signal transition to a voltage to which electro-optic modulator 150 responds by switching from a minimum output transmission state to a maximum output transmission state, and thereafter to an intermediate output transmission state, of the pulsed laser emission. The intermediate output transmission state is between the maximum and minimum output transmission states. This switching sequence of output transmission states is achieved by a voltage level appearing at the output of EO driver 250 that drives electro-optic modulator 150 to a voltage overdrive condition. To reach the voltage overdrive condition, electro-optical modulator 150 slews through the maximum output transmission state, to form a high amplitude portion 412 of the pulsed laser emission, and then to the intermediate output transmission state, to dwell there for a time to form the flat amplitude portion 414 of the pulsed laser emission. FIG. 12 (lower trace) shows the effect on the pulsed laser emission that results from the transition by EO driver 250 producing minimum to maximum output transmission, and thereafter to intermediate output transmission.

The Trigger2 signal is produced as a result of the elapsed rise time of laser pulse 106 between its pulse amplitude levels corresponding to trigger threshold signals 236 and 238. About 10 ns after the rising edge of the Trigger2 signal, EO driver 250 produces at its output a Driver1 (Stop) signal transition to a voltage to which electro-optic modulator 150 responds by switching from the intermediate output transmission state to the minimum output transmission state. FIG. 12 (lower trace) shows the effect on the pulsed laser emission that results from the transition by EO driver 250 producing intermediate to minimum output transmission. The switching from the intermediate to the maximum output transmission states is achieved by slewing electro-optical modulator 150 back through the maximum output transmission state to the minimum output transmission state to form the second falling edge of the pulsed laser emission. The maximum output transmission state forms at the end of the pulsed laser emission a second peak amplitude portion (not shown in FIG. 12), which should be negligible because of the low pulse amplitude energy level of the laser pulse 106 at that time.

FIGS. 9 and 11 show a resistor-diode array 500 positioned between electro-optical modulator 150 and the output of driver 250 of each of the respective electro-optical modulator drive circuitry 310 and 410 to provide to electro-optical modulator 150 the drive control output signal with a controllable shape. Because the crystal of electro-optical modulator 150 appears electrically as a capacitor, the inclusion of a resistor or an array of switchable resistors can be used to control the voltage slopes of the tailored pulse temporal profile. Resistor-diode array 500 includes two parallel-connected subcircuits, each including parallel-connected resistors 502 and 504 in series connection with a steering diode 506. Resistor 504 in series connection with a switch 508 can be switched in or out of its subcircuit to change the effective resistance value, and steering diodes 506 of the subcircuits are installed in opposite directions to facilitate asymmetric slopes for the rising and falling edges of the tailored pulse temporal profile.

It will be obvious to those having skill in the art that many changes may be made to the details of the above-described embodiments without departing from the underlying principles of the invention. For example, nonlinear conversion forming a frequency-converted laser output can be performed also to provide a longer wavelength laser output. The scope of the present invention should, therefore, be determined only by the following claims.

The invention claimed is:

1. A dynamic laser pulse shaping generator emitting tailored pulse output, comprising:
  a pulsed laser source generating pulsed laser emission exhibiting jitter that results from effects of indeterminate energy build-up of laser pulse energy;
  an optical detector producing a detector output signal in response to occurrence of the pulsed laser emission;
  a controller providing control command output;
  an optical modulator optically associated with the pulsed laser source to produce a sequence of multiple states of output transmission of the pulsed laser emission, the optical modulator being of a Pockels cell type that includes crystal material selected from KDP, KD*P, ADP, AD*P, RTP, RTA, BBO, or $LiNbO_3$ electro-optical materials and exhibits electrical capacitance;
  drive circuitry receiving first and second input signals to develop, in response to the detector output signal and the control command output, drive control output that is applied to the optical modulator to produce the sequence of multiple states of output transmission, the first input signal causing the optical modulator to produce a first transition between lower and higher output transmission states of the pulsed laser emission, and the second input signal causing the optical modulator to produce a second transition from the higher output transmission state to an intermediate output transmission state of the pulsed laser emission, in which the intermediate output transmission state is between the higher and lower output transmission states of the pulsed laser emission;
  electrical resistance positioned to affect the application of the drive control output to the optical modulator, the electrical capacitance and resistance cooperating to shape at least one of the first and second output transmission state transitions; and
  the detector output signal synchronizing the occurrence of the pulsed laser emission and the control command output in the production of the sequence of multiple states of output transmission of the pulsed laser emission to form a jitter-suppressed tailored pulse output exhibiting a tailored laser pulse temporal profile established by the sequence.

2. The laser pulse shaping generator of claim 1, in which the drive circuitry includes first and second modulator drivers and the drive control output includes first and second drive control signals produced at outputs of the respective first and the second modulator drivers, in which the optical modulator constitutes a first optical modulator, and further comprising:
 a second optical modulator in optical association with the first optical modulator, the first and second optical modulators responding to the respective first and second drive control signals; and
 comparator and time delay circuitry responsive to the detector output signal to generate the first and second drive control signals sequentially in the production of the sequence of multiple states of output transmission of the pulsed laser emission.

3. A dynamic laser pulse shaping generator emitting tailored pulse output, comprising:
 a pulsed laser source generating pulsed laser emission exhibiting jitter that results from effects of indeterminate energy build-up of laser pulse energy;
 an optical detector producing a detector output signal having a signal level in response to occurrence of the pulsed laser emission;
 a controller providing control command output that includes first and second command signals having signal levels;
 an optical modulator optically associated with the pulsed laser source to produce a sequence of multiple states of output transmission of the pulsed laser emission; and
 drive circuitry producing, in response to the detector output signal and the control command output, drive control output that is applied to the optical modulator to produce the sequence of multiple states of output transmission; and
 comparator circuitry producing a first trigger signal and a time-displaced version of the first trigger signal, the first trigger signal indicating a comparative relationship between the signal levels of the detector output signal and the first command signal to cause production by the optical modulator of a first in the sequence of multiple states of output transmission of pulsed laser emission upon occurrence of the detector output signal level exceeding the first command signal level, and the time-displaced version of the first trigger signal indicating a comparative relationship between the signal levels of the detector output signal and the second command signal to cause production by the optical modulator of a second in the sequence of multiple states of output transmission of pulsed laser emission upon occurrence of the detector output signal level exceeding the second command signal level, the second of the multiple states occurring at a time after the first of the multiple states;
 the detector output signal synchronizing the occurrence of the pulsed laser emission and the control command output in the production of the sequence of multiple states of output transmission of the pulsed laser emission to form a jitter-suppressed tailored pulse output exhibiting a tailored laser pulse temporal profile established by the sequence.

4. A dynamic laser pulse shaping generator emitting tailored pulse output, comprising:
 a pulsed laser source generating pulsed laser emission exhibiting jitter that results from effects of indeterminate energy build-up of laser pulse energy;
 an optical detector producing a detector output signal having a signal level in response to occurrence of the pulsed laser emission;
 a controller providing control command output including first and second command signals having signal levels;
 first and second optical modulators optically associated with each other and with the pulsed laser source to produce a sequence of multiple states of output transmission of the pulsed laser emission;
 drive circuitry including first and second modulator drivers producing, in response to the detector output signal and the control command output, respective first and second drive control signals to which the respective first and second optical modulators respond to produce the sequence of multiple states of output transmission;
 comparator and time delay circuitry responsive to the detector output signal to generate the first and second drive control signals sequentially in the production of the sequence of multiple states of output transmission of the pulsed laser emission, the comparator and time delay circuitry producing:
 a first trigger signal and a time-displaced version of the first trigger signal each of which indicating a comparative relationship between the signal levels of the detector output signal and the first command signal to cause production by the first optical modulator of a first subset of the sequence of multiple states of output transmission of the pulsed laser emission, and
 a second trigger signal and a time-displaced version of the second trigger signal each of which indicating a comparative relationship between the signal levels of the detector output signal and the second command signal to cause production by the second optical modulator of a second subset of the multiple states of output transmission of the pulsed laser emission, at least one state of output transmission of the second subset taking place after at least one state of output transmission of the first subset; and
 whereby the detector output signal synchronizes the occurrence of the pulsed laser emission and the control command output in the production of the sequence of multiple states of output transmission of the pulsed laser emission to form a jitter-suppressed tailored pulse output exhibiting a tailored laser pulse temporal profile established by the sequence.

5. A method of suppressing introduction of jitter in a tailored pulse output derived from pulsed laser emission generated by a laser source, the laser source including a laser cavity in which laser pulse energy builds during an indeterminate build-up time and a modulator that causes emission of the laser pulse energy in response to a laser pulse firing signal characterized by signal jitter, comprising:
 using an optical detector in optical association with the laser source to produce a detector output signal in response to occurrence of the pulsed laser emission;
 directing the pulse laser emission to a pulse shaping optical modulator;
 providing control command output from a controller; and
 providing drive circuitry to produce, in response to the detector output signal and the control command output, a drive control output for application to the pulse shaping optical modulator to produce multiple states of output transmission of the pulsed laser emission to form a tailored pulse output, the detector output signal produced in response to occurrence of the pulsed laser emission and the control command output suppressing introduction of jitter resulting from effects of the indeterminate energy build-up time of laser pulse energy and the signal jitter of the laser pulse firing signal in the production of multiple states of output transmission forming the tailored pulse output; and directing the tailored pulse output for incidence on a target material to perform laser processing or micromachining of it.

6. The method of claim 5, in which the laser processed or micromachined target material includes an electrically conductive link structure of a semiconductor memory device or electronic circuit.

7. The method of claim 5, in which the laser processing or micromachining of a target material includes laser scribing or dicing of a semiconductor material.

8. The method of claim 7, in which the semiconductor material is selected from a group including a semiconductor integrated circuit, a silicon wafer, and a solar cell.

9. The method of claim 5, in which the target material is selected from a group including metal, dielectric, polymeric, and plastic material.

10. A dynamic laser pulse shaping generator emitting tailored pulse output, comprising:

a pulsed laser source generating pulsed laser emission at a first center wavelength, the pulsed laser emission exhibiting jitter that results from effects of indeterminate energy build-up of laser pulse energy;

an optical detector producing a detector output signal in response to occurrence of the pulsed laser emission;

an optical modulator optically associated with the pulsed laser source to produce a sequence of multiple states of output transmission of the pulsed laser emission;

a controller providing control command output;

drive circuitry producing, in response to the control command output, drive control output that is applied to the optical modulator to produce the sequence of multiple states of output transmission of the pulsed laser emission, the detector output signal synchronizing the occurrence of the pulsed laser emission and the control command output to form a jitter-suppressed modulator tailored pulse output exhibiting a first tailored laser pulse temporal profile established by the sequence at the first center wavelength;

an optical harmonic converter optically associated with the optical modulator to convert the first center wavelength and produce a harmonic converter tailored pulse output exhibiting a second tailored laser pulse temporal profile resulting in part from nonlinear effects of harmonic conversion at a second center wavelength that is shorter than the first center wavelength; and the control command output timing the sequencing of the production of the multiple states of output transmission to form the first tailored laser pulse temporal profile of a shape that precompensates for the nonlinear effects of harmonic conversion to produce the harmonic converter tailored pulse output exhibiting a second tailored laser pulse temporal profile of a desired shape.

11. The laser pulse shaping generator of claim 10, in which the first and second tailored temporal pulse profiles have respective first and second peak powers that are different from each other.

12. The laser pulse shaping generator of claim 11, in which the first peak power is less than the second peak power.

13. The laser pulse shaping generator of claim 10, in which the first center wavelength is that of green light and the second center wavelength is that of UV light.

14. A dynamic laser pulse shaping generator emitting tailored pulse output, comprising:

a pulsed laser source generating pulsed laser emission exhibiting jitter that results from effects of indeterminate energy build-up of laser pulse energy;

an optical detector producing a detector output signal in response to occurrence of the pulsed laser emission;

an optical modulator optically associated with the pulsed laser source to produce multiple states of output transmission of the pulsed laser emission;

a controller providing control command output; and drive circuitry responsive to the detector output signal and the control command output to produce drive control output that is applied to the optical modulator, the drive circuitry including comparator and time delay circuitry producing a trigger signal and a time-displaced version of the trigger signal that indicate a comparative relationship of the detector output signal and the control command output and contribute to production of the drive control output as a sequence of the multiple states of output transmission of the pulsed laser emission, the detector output signal synchronizing the occurrence of the pulsed laser emission and the control command output in the production of the sequence of multiple states of output transmission of the pulsed laser emission to form a jitter-suppressed tailored pulse output exhibiting a tailored laser pulse temporal profile established by the sequence.

15. The laser pulse shaping generator of claim 14, in which the drive circuitry receives first and second input signals to develop the drive control output, the first input signal causing the optical modulator to produce a first transition between lower and higher output transmission states of the pulsed laser emission, and the second input signal causing the optical modulator to produce a second transition from the higher output transmission state to an intermediate output transmission state of the pulsed laser emission, in which the intermediate output transmission state is between the higher and lower output transmission states of the pulsed laser emission.

16. The laser pulse shaping generator of claim 15, in which the optical modulator is of a type that exhibits electrical capacitance, and further comprising electrical resistance positioned to affect the application of the drive control output to the optical modulator, the electrical capacitance and resistance cooperating to shape at least one of the first and second output transmission state transitions.

17. The laser pulse shaping generator of claim 16, in which the optical modulator is of a Pockels cell type.

18. The laser pulse shaping generator of claim 17, in which the Pockels cell includes crystal material selected from KDP, KD*P, ADP, AD*P, RTP, RTA, BBO, or $LiNbO_3$ electro-optical materials.

19. The laser pulse shaping generator of claim 14, in which the time delay circuitry includes a programmable time delay to provide selectable time displacement of the trigger signal.

* * * * *